United States Patent [19]

Baderschneider et al.

[11] Patent Number: 5,337,385
[45] Date of Patent: Aug. 9, 1994

[54] OPTICAL WAVEGUIDE TERMINATING DEVICE

[75] Inventors: Kurt P. Baderschneider, Dreieich; Friedrich J. A. Kourimsky, Bensheim; Gheorghe Hotea, Griesheim, all of Fed. Rep. of Germany

[73] Assignee: The Whitaker Corporation, Wilmington, Del.

[21] Appl. No.: 945,978

[22] PCT Filed: Feb. 28, 1992

[86] PCT No.: PCT/US92/01628

§ 371 Date: Nov. 16, 1992

§ 102(e) Date: Nov. 16, 1992

[87] PCT Pub. No.: WO92/15909

PCT Pub. Date: Sep. 17, 1992

[30] Foreign Application Priority Data

Mar. 1, 1991 [DE] Fed. Rep. of Germany ..... 41065954
Dec. 12, 1991 [DE] Fed. Rep. of Germany ....... 4141009

[51] Int. Cl.$^5$ .......................... G02B 6/26; G02B 6/38
[52] U.S. Cl. .......................... 385/59; 385/60; 385/62; 385/76; 385/77; 385/78; 385/66; 385/84; 385/87
[58] Field of Search ....................... 385/59, 60, 62, 64, 385/66, 70, 71, 72, 76, 77, 78, 81, 84, 87, 139

[56] References Cited

U.S. PATENT DOCUMENTS

| | | | |
|---|---|---|---|
| 4,102,561 | 7/1978 | Hawk et al. | 385/62 X |
| 4,134,641 | 1/1979 | Kao et al. | 385/84 X |
| 4,181,401 | 1/1980 | Jensen | 385/62 X |
| 4,355,862 | 10/1982 | Kock | 385/81 |
| 4,435,036 | 3/1984 | Sasakawa | 385/81 X |
| 4,440,471 | 4/1984 | Knowles | 385/84 X |
| 4,668,045 | 5/1987 | Melman et al. | 385/82 X |
| 4,674,833 | 6/1987 | Des Forges et al. | 385/81 X |
| 4,693,550 | 9/1987 | Brown et al. | 385/81 X |
| 4,725,118 | 2/1988 | Serrander | 385/82 X |
| 4,728,171 | 3/1988 | Schofield et al. | 385/59 X |
| 4,877,303 | 10/1989 | Caldwell et al. | 385/81 X |
| 4,961,624 | 10/1990 | Savitsky et al. | 385/81 X |
| 5,101,463 | 3/1992 | Cubukciyan et al. | 385/84 X |
| 5,111,520 | 5/1992 | Kawanami et al. | 385/84 X |
| 5,111,521 | 5/1992 | Kawanami et al. | 385/84 X |
| 5,121,455 | 6/1992 | Palecek | 385/84 X |
| 5,208,887 | 5/1993 | Grinderslev | 385/81 |

FOREIGN PATENT DOCUMENTS

| | | | |
|---|---|---|---|
| 0009330 | 4/1980 | European Pat. Off. | 385/91 X |
| 0182577 | 5/1986 | European Pat. Off. | 385/55 X |
| 0374136 | 6/1990 | European Pat. Off. | 385/76 X |

*Primary Examiner*—Brian Healy
*Attorney, Agent, or Firm*—Eric J. Groen; Timothy J. Aberle

[57] ABSTRACT

A terminating device for an optical waveguide, comprising a sleeve-like terminating member (23, 25; 271) in which an optical waveguide section (47; 229) having a coupling face ground to be plane is glued on the one hand and in which an optical waveguide (19, 21, 213) abutting said optical waveguide section (47; 229) is inserted on the other hand. Such a terminating member can be used in an optical waveguide connector (15,17; 211). In an optical waveguide connection assembly (11; 211) using such connectors (15, 17; 211), portions of the terminating members (23, 25; 271) projecting from a coupling face of the connector (15, 17; 211) are centered in a centering means (83; 299) with respect to their required radial position.

23 Claims, 21 Drawing Sheets

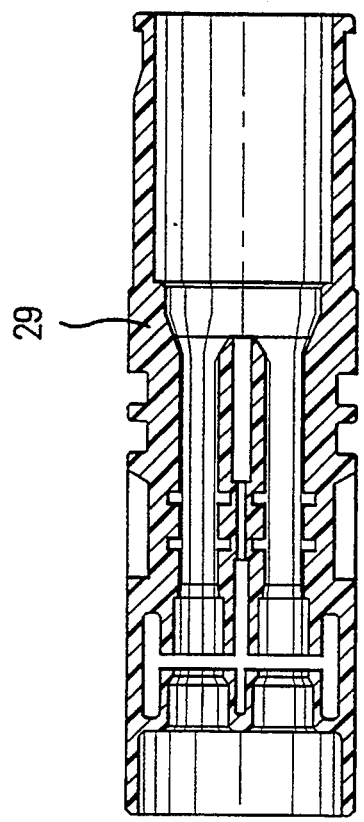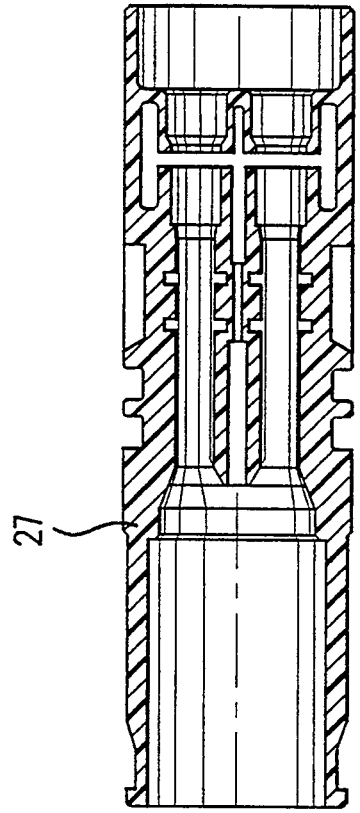
FIG. 4

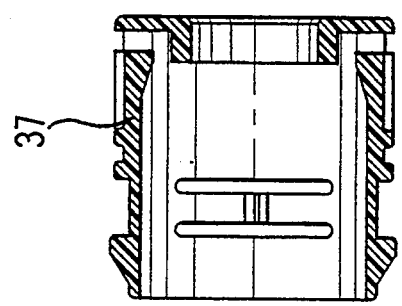
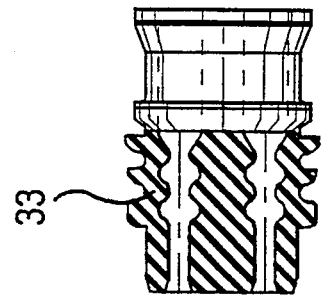
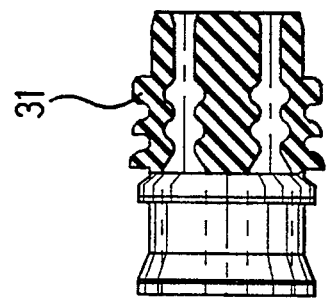
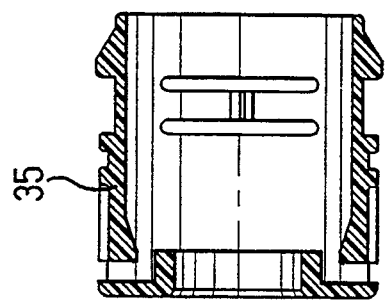
FIG. 5

OPTICAL WAVEGUIDE TERMINATING DEVICE

BACKGROUND OF THE INVENTION

The invention relates to a terminating device for at least one optical waveguide, an optical waveguide connector and an optical waveguide connector assembly. There are many fields of application in which optical waveguides in the form of optical fibers are employed for signal transmission. In comparison with signal transmission by means of electrical conductors, optical waveguides offer the advantage of considerably higher frequency band width and the elimination of problems due to electromagnetic interference signals. The term "optical waveguide" will be abbreviated in the following description by "OWG".

Just as with electrical conductors, the need for connectors exists also for optical waveguides. Such pluggable connectors are either used for coupling optical waveguides with each other, by holding their ends to be coupled in closely opposed relation, or optical waveguides are coupled with light-transmitting or light-receiving optoelectronic components by holding the optical waveguide ends in closely opposed relation to the optically transmitting or receiving areas of an optoelectronic component.

In order to keep the light transmission losses in pluggable connections for optical waveguides as low as possible, care must be taken that the optical waveguides to be coupled are centered as exactly as possible with respect to each other or with respect to the optoelectronic components and that the areas to be optically coupled are held as parallel and close to each other as possible. Due to the small diameter of common optical waveguides, very high accuracy of the mutual radial positioning of the optical waveguides to be coupled with the pluggable connection is necessary. When using conventional technologies for optical waveguide connections, it turns out almost impossible, especially for multi-pole connectors, to ensure such accurate radial positioning simultaneously for all optical waveguides to be coupled.

SUMMARY OF THE INVENTION

The invention therefore is to indicate measures through which this problem can be overcome.

This object is met on the one hand by a terminating device for an optical waveguide, comprising a sleeve-like terminating member provided with a through-opening having an optical waveguide section firmly disposed in one end thereof and an end portion of the optical waveguide to be terminated being insertable into the other end thereof substantially so as to reach the optical waveguide section, the free end of the optical waveguide section remote from the optical waveguide to be terminated being provided with a plane surface.

The optical waveguide section preferably consists of plastics material, for instance acrylic glass, is glued into the terminating member and is ground to be plane at the free end thereof, preferably together with the corresponding end of the terminating member.

The terminating members are preferably made as separate components, together with the optical waveguide sections mounted therein and inclusive of the plane grinding operation. These may then be inserted, as required, in optical waveguide connections with different pole numbers and different construction. This can take place either in the shop of the manufacturer of such connectors or at the site where such connectors are mounted or repaired.

To this end, an optical waveguide to be terminated is cut, during manufacture of the connectors or at the mounting site, to the desired length and is inserted with its cut end into the waveguide section free or empty end of the through-opening of a terminating member until it meets the optical waveguide section.

Upon assembly or repair of such a connector at the mounting site, the assembler usually does not have a possibility of grinding the cut end of an optical waveguide in plane manner. For this purpose, an adaptation gel is preferably provided between the optical waveguide section and the end of the optical waveguide introduced in the terminating member, said gel having a refractive index that is matched to that of the optical waveguide section and of the optical waveguide. Light transmission impairments as a result of an air gap when the end side faces of two optical waveguides to be coupled are not located exactly against each other are avoided by such adaptation gel filling the air gap.

Further development features of the terminating device are gatherable from the dependent claims The invention furthermore provides an optical waveguide connector, comprising a connector housing for receipt of at least one optical waveguide adapted to be coupled with an optical waveguide or an optoelectronic component in a complementary connector. Through the connector housing extends at least one receiving cavity for receiving at least one optical waveguide. In the mating side end portion of the receiving cavity, there is arranged at least one terminating device of the type elucidated hereinbefore.

One connector housing part preferably contains a centering means for the terminating member, said centering means taking care that the terminating member is held as exactly as possible in its required position. It is particularly advantageous to fix only the end portion of the terminating member facing the complementary connector in a centering receiving chamber in precisely positioned manner and to support the remainder of the terminating member in floating manner. In this case, close tolerances need to be observed only with respect to the positioning of the centering receiving chamber, whereas the remaining housing parts of the connector may have relatively large tolerances. This reduces the technical expenditure enormously and results in a corresponding cost reduction.

Further developments and features of the connector of the invention and of a connector assembly composed therewith are indicated in dependent claims.

By using the terminating members according to the invention, assembly of optical waveguide connectors is facilitated significantly. The assembler, be it in the factory of the connector manufacturer or during assembly or repair at the site of use of such connectors, merely needs to cut the optical waveguide to be coupled to the desired length, insert it into the terminating member that has already been provided with the optical waveguide section and the adaptation gel, and insert the thus gained unit of terminating member and optical waveguide into the connector housing. The assembler need not deal with plane grinding operations as required with conventional optical waveguide connectors in which the optical waveguides are directly inserted in the connector housing. He could not do so anyway when assembly takes place at the site of use. The measures according to the invention nevertheless result in an optical waveguide connector in which the optical waveguide end surfaces to be coupled with a complementary connector are ground to be plane.

The centering means with the centering receiving chambers for the terminating members of the optical waveguides to be connected in the two connectors to be coupled or, respectively, for the optoelectronic components in the one part of a connector assembly and for the terminating members for the optical waveguides in the other part of the connector assembly, are preferably accommodated in a common housing part. This may be either a housing sleeve from both ends of which the connectors with the respective terminating members are inserted. However, this may also be part of one of the two connectors to be coupled. The centering means of this connector then extends so far towards the connector to be coupled therewith that, in the coupled condition of the two connectors, the centering means arranged on the one connector does not only receive its own terminating members or optoelectronic components in centering manner, but also the terminating members or optoelectronic components of the other connector.

Due to this measure together with the floating support of those portions of the terminating members that are not received in the centering receiving chambers of the centering means, it is ensured also in case of multi-pole optical waveguide connectors that the optically effective surfaces of the optical waveguides are always centered, i.e. radially aligned, with high accuracy with respect to the optical surfaces of the optical waveguides or optoelectronic components to be coupled thereto, even if the coupled connectors as such, due to manufacturing tolerances and coupling clearances, are disposed in considerably less exact alignment with respect to each other.

An optical waveguide connector of the type according to the invention is especially well suited for being used in motor vehicles. For this intended use, optical fibers of plastics material are preferred for the optical waveguides. Optical fibers of glass would be subject to a risk of breakage due to the vibrations and shocks occurring in motor vehicles. The optical waveguide sections located in the terminating members and the optical waveguides to be terminated by the terminating members then preferably consist of optical fibers of the same plastics material, such as e.g. acrylic glass.

Due to the sealing plugs and sealing rings, as provided in a preferred embodiment of the invention, one arrives at a waterproof optical waveguide connector assembly. This, too, is an important aspect for use in motor vehicles, where especially in the engine compartment, in which such connector assemblies are frequently mounted, splashing water may impinge thereon.

In case of use in motor vehicles, the centering means also turns out very advantageous with regard to the very high temperature fluctuations arising in motor vehicles, especially in the engine compartment thereof. In particular due to the cooperation of the centering means with the floating support for the terminating members, a self-adjusting effect is obtained over the entire temperature range and over lifetime.

There is the possibility that the light transmitting end face of the OWG section, due to thermal or mechanical influences, moves away from an OWG or an optoelectronic component in a complementary connector, so that a gap is created therebetween resulting in light attenuation. Furthermore, thermal effects may have the result that the normally abutting end faces of OWG section and OWG to be terminated are lifted off from each other. This may result in a vacuum pressure in the adaptation gel provided therebetween, with the consequence that air bubbles are created in the adaptation gel causing disturbances in the optical transmission properties. On the other hand there is also the risk that tensile forces exerted on the OWGs to be terminated cause lifting off of optically coupled areas from each other.

Such problems are to be overcome with a second embodiment of the invention.

This is achieved with a terminating device for OWGs, comprising a sleeve-like terminating member provided with an OWG through-opening having an OWG section firmly disposed in one end thereof and an end portion of an OWG to be terminated being insertable into the other end thereof substantially so as to reach the OWG section, and comprising a locking means disposed on the sleeve body which, when the OWG is inserted in the OWG through-opening, engages the end portion of the OWG located in the sleeve body and is held in the sleeve body so as to be movable by a predetermined amount in the longitudinal direction of the OWG through-opening.

Such a terminating device cooperates in advantageous manner with an OWG connector, comprising a connector housing for receipt of at least one OWG adapted to be coupled with an OWG or an optoelectronic component in a complementary connector, and comprising at least one through channel for an OWG which extends in the longitudinal direction of the connector housing and which has the terminating device disposed in its end portion on the connector mating side, said through channel being provided furthermore with a spring supported in the through-channel and cooperating with the locking means of the terminating device and biasing the locking means in the direction towards the mating side end portion of the through-channel.

The spring has two effects. Firstly, the spring, via the locking means, urges the OWG held therein against the end face of the OWG section facing towards the OWG. This is rendered possible due to the fact that the locking means is movable by a certain amount in the longitudinal direction of the OWG through-opening and thus in the longitudinal direction of the OWG. When the end face of the OWG due to the spring effect has been moved so as to abut the opposing end face of the OWG section, the spring effect of the spring has the result that the entire terminating device is then urged towards the mating side end of the connector housing and thus against the OWG or the optoelectronic component in the complementary connector.

Thus, the solution according to the invention provides by means of one single spring that the opposing optical areas of OWG and OWG section as well as the opposing optical areas of OWG section and OWG or optoelectronic component of the complementary connector are urged towards each other.

The sleeve body of the terminating member preferably has, at its end remote from the OWG section, an actuating ram or tappet which is movable in the longitudinal direction of the OWG and adapted to be urged towards the sleeve body of the terminating member by means of a coil spring provided in the through channel. The actuating ram preferably is formed integrally with the sleeve body and connected to the latter via a resilient web. The actuating ram presses against the locking means with its side remote from the coil spring. The locking means preferably is provided in the form of a locking fork firmly seated on the OWG in a clamping fit such that movement of the locking fork results in a corresponding movement of the OWG.

The sleeve body, in that portion of its longitudinal dimension in which the OWG section and the OWG to be terminated meet each other, preferably has a portion in the form of a sleeve tube, with said sleeve tube being made of such material and with such thin wall thickness that the tube wall is resilient. This provides mutual centering of OWG section and OWG inserted in the terminating device.

This centering type is particularly effective when the tube interior is confined by three planar surfaces which, as seen in a cross-section of the tube, constitute substantially an isosceles triangle and whose centers form points of contact for the OWG and the OWG section, respectively.

For obtaining optimum optical transmission conditions, it must be ensured that the OWG section is retained in the terminating member in non movable manner. This is achieved preferably by gluing the OWG section in the OWG through-opening of the sleeve body.

The free end face of the OWG section facing towards the complementary connector preferably is provided in the form of a collective lens. The effect achieved thereby is that the light leaving the OWG section is directed practically completely into the end face of an opposing OWG or optoelectronic component even if there is no optimum alignment between the two. The collective lens at the end face of the OWG section is dimensioned such that the light leaving this end face of the OWG section is focussed into the interior of the opposing OWG or optoelectronic component. Due to this end face of the OWG section in the form of a collective lens, good optical coupling properties are still achieved when the optical areas to be coupled do not abut each other in optimum manner.

For avoiding impairments of the optical coupling by tensile forces that may be exerted on the OWG, the invention provides an effective strain relief in the form of a crimping barrel which is crimped to the outer circumference of the OWG at one crimping region and to a sleeve-shaped strain relief means surrounding the OWG at a further, adjacent crimping region. The strain relief means is fixed in the connector housing of the OWG connector housing.

Furthermore, the crimping barrel is preferably provided with at least one locking lance projecting obliquely from the crimping barrel and the free end thereof cooperating with a radially directed locking shoulder in the through-channel.

Under normal conditions, especially normal temperature conditions, the free end of the locking lance is slightly spaced from the locking shoulder so that, in case of thermal expansions and thermally caused movements, sufficient clearance is left for the OWG to which the crimping barrel is crimped for performing movements towards the OWG entrance side end of the connector housing.

Further advantageous developments of the terminating device and of an OWG connector equipped therewith are indicated in dependent claims.

BRIEF DESCRIPTION OF THE DRAWINGS

The invention as well as further developments of the invention, further object aspects and further advantage aspects will now be elucidated in more detail in conjunction with an embodiment of the invention shown in the drawings in which:

FIGS. 2 to 5 show the individual parts of the connector assembly depicted in FIG. 1;

DETAILED DESCRIPTION OF THE INVENTION

Figure 1:
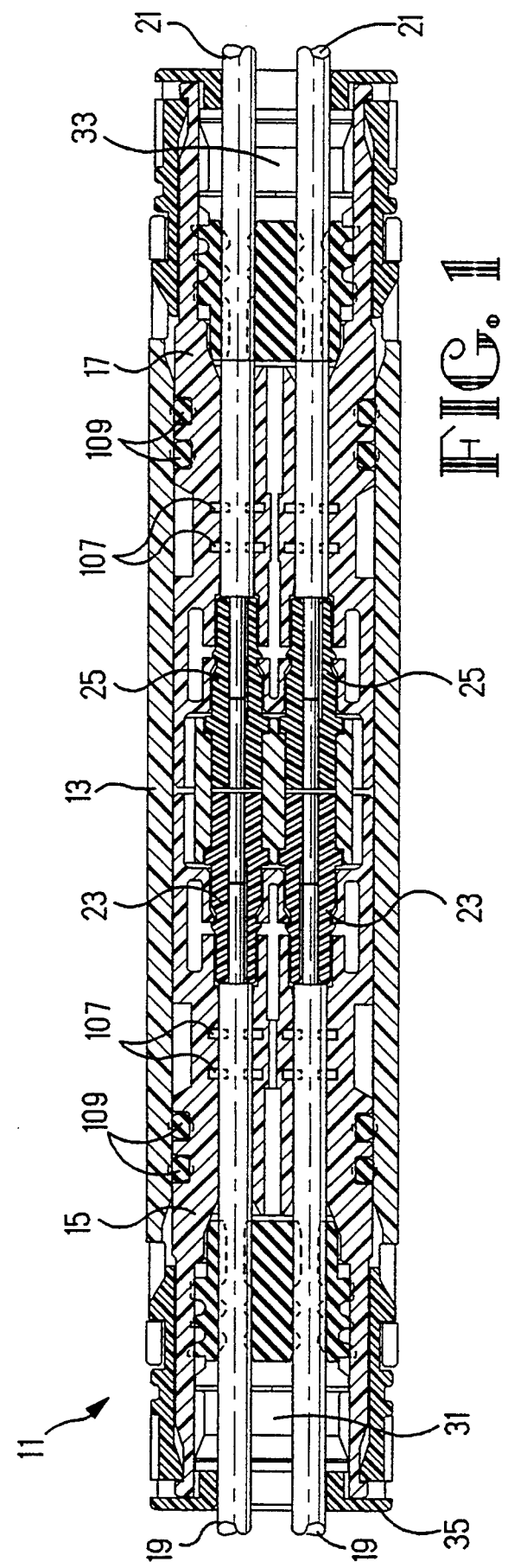
FIG. 1 shows a longitudinal sectional view of a first embodiment of a connector assembly constructed according to the invention.

FIG. 1 shows a longitudinal sectional view of an optical waveguide connector assembly 11 comprising a housing sleeve 13 in which a first optical waveguide connector 15 and a second optical waveguide connector 17 are disposed in a coupled condition. These connectors are two-pole pluggable connectors, i.e. the connector assembly 11 serves to connect two optical waveguides 19 in the first connector 15 to two optical waveguides 21 in the second connector 17. The optical waveguides 19 and 21 are each terminated by a terminating member 23 and 25, respectively. Free end faces of the terminating members 23 are each located opposite a free end face of one of the terminating members 25. The optical waveguides 19 and the terminating members 23 are accommodated in a first connector housing 27 of the first connector 15, and the optical waveguides 21 with the associated terminating members 25 are accommodated in a second connector housing 29 of the second connector 17. At their optical waveguide exit ends, the connector housings 27 and 29 are each closed by a sealing and strain relieving plug 31 and 33, respectively. The two ends of the housing sleeve 13 are each covered by a bayonet-type cover 35 and 37, respectively. The bayonet-type covers 35 and 37 are releasably attached at the respective end of the housing sleeve 13 by means of a bayonet-type fastening means.

Figure 2:
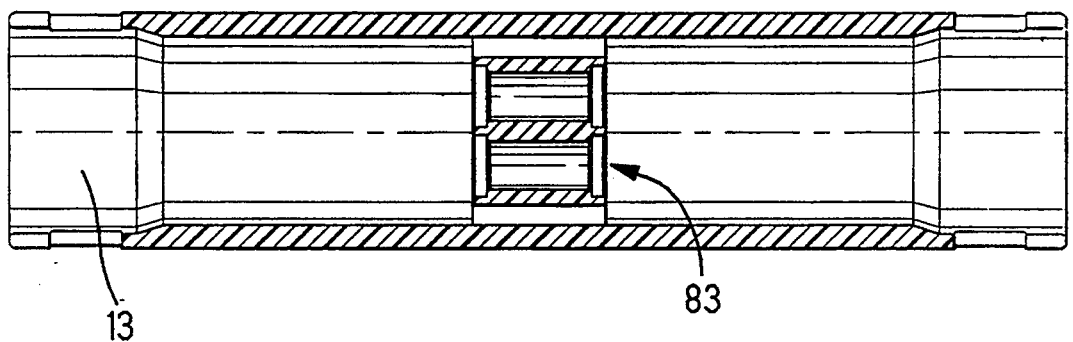
Figure 3:
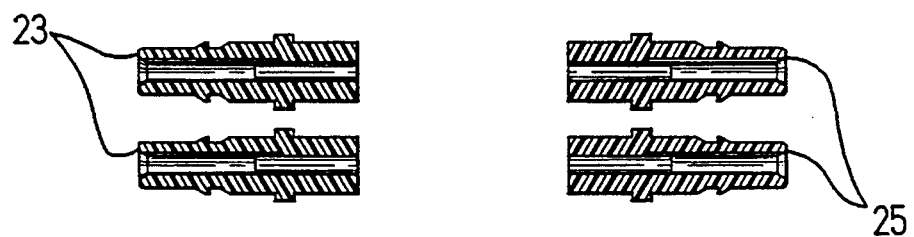

For rendering the construction of the connector assembly 11 recognizable more easily, all individual parts thereof are depicted in FIGS. 2 to 5 in their non-assembled condition. FIG. 2 shows the housing sleeve 13. FIG. 3 depicts the four terminating members 23 and 25. The two connector housings 27 and 29 are shown in FIG. 4, and FIG. 5 shows the two sealing and strain relieving plugs 31 and 33 as well as the two bayonet-type covers 35 and 37.

All these details will now be discussed in more detail by way of the enlarged views of FIG. 6 to 9.

Figure 6:
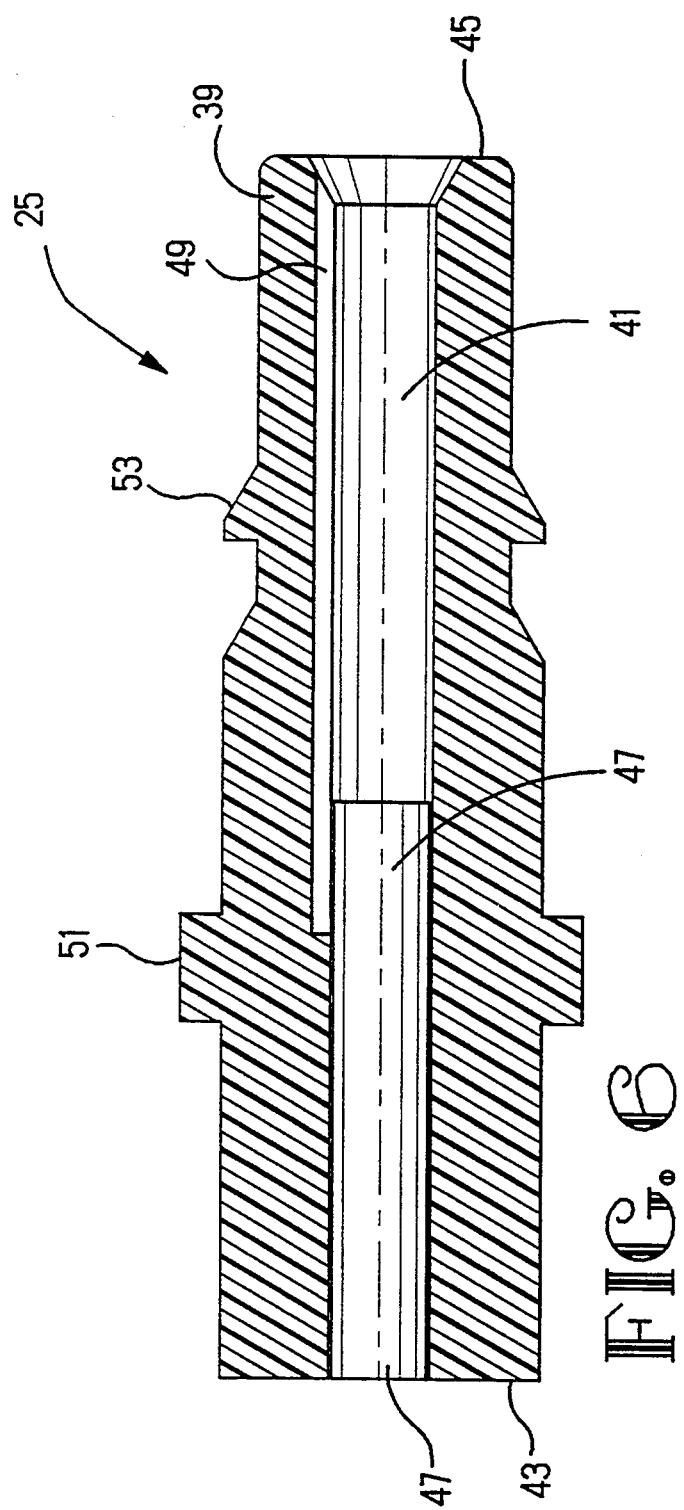
FIGS. 6 to 10 show enlarged views of these individual parts.

FIG. 6 shows a longitudinal sectional view of a terminating member, e.g. of terminating member 25. The latter has a sleeve body 39 having an axial through opening 41 extending from a coupling face 43 to an optical waveguide insertion end 45. Glued into the through-opening 41 is an optical waveguide section 47 which at one end is aligned with the coupling face 43 of the sleeve body 39 and at the other end extends approximately to the axial center of the through opening 41. The end of the optical waveguide section 47 ending flush with the coupling face 43 is ground so as to be plane, preferably together with the coupling face 43 of the sleeve body 39.

Before the end of an optical waveguide, for instance 21, which is cut to the required length, is introduced into the left-free portion of the through-opening 41, an adaptation gel is introduced into the through-opening 41. The refractive index thereof is matched to the refractive index of optical waveguide 21 and to the refractive index of optical waveguide section 47. The adaptation gel prevents optical transmission problems for the event that the opposing end face areas of optical waveguide section 47 and of optical waveguide 21 do not abut each other optimum manner, so that an air gap would be formed between optical waveguide section 47 and optical waveguide 21 if there were no adaptation gel. For definitely avoiding such an air gap, plenty of adaptation gel is introduced into through-opening 41. For rendering possible that the optical waveguide 21, despite the plentiful amount of adaptation gel introduced, can be slid into the through-opening 41 possibly until it contacts the optical waveguide section 47, the internal wall of the through-opening 41 is formed with a gel overflow groove 49 extending in the longitudinal direction of the through-opening 41 and opening outwardly at the optical waveguide insertion end 45 of the through opening 41.

Preferably the terminating members are delivered with the optical waveguide section 47 glued in and ground plane and with the adaptation gel already filled in, either to the connector manufacturing department or connector manufacturer or to the assembler at the site of use. The optical waveguide then merely needs to be cut to the required length, introduced in the through opening 41 until it hits the optical waveguide section 47, and inserted together with the terminating member 25 into connector housing 27 or 29.

Optical waveguide section 47 consists preferably of plastics material, e.g. acrylic glass. In particular when the connection assembly 11 and the waveguides 19 and 21 are subjected to shocks, vibrations and similar mechanical loads, for instance in a motor vehicle, it is recommendable to use plastics material, e.g. acrylic glass, for the optical waveguides 19, 21 as well.

The sleeve body 39 of the terminating member 25 has on its outer circumference a circumferential rib 51 serving for axial positioning, as well as a latching projection 53 for latching the terminating member 25 in one of the connector housings 27 or 29.

Figure 7:
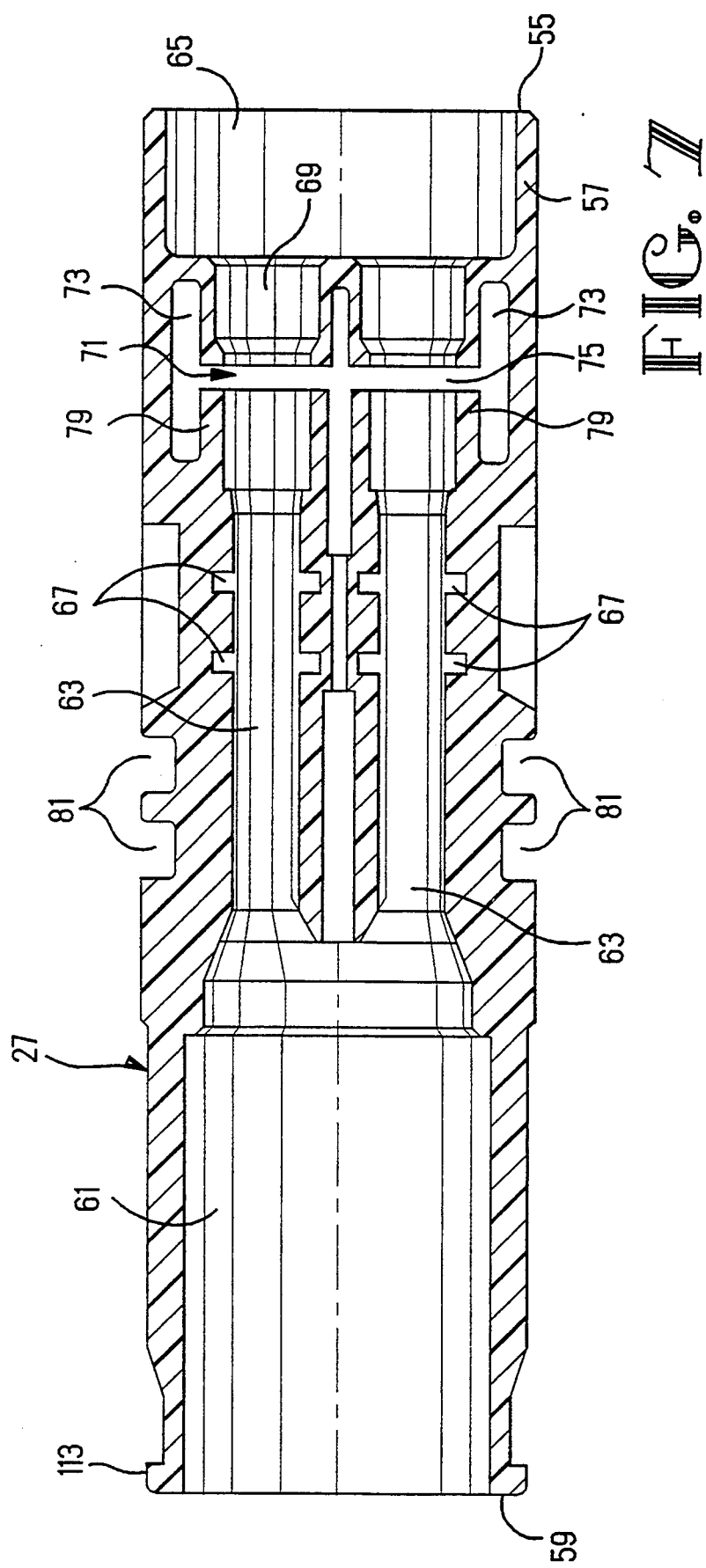

FIG. 7 shows a longitudinal sectional view of one the two connector housings, for instance connector housing 27. This housing is provided at its mating end 55 with a projecting hood 57. At its optical waveguide insertion end 59, connector housing 27 is provided with a cavity 61 for receipt of the sealing and strain relieving plug 31 and of the bayonet-type cover 35. Two through-channels 63 for one each of the two optical waveguides 19 extend between hood 57 and cavity 61 in the longitudinal direction of the connector housing 27. These open on the one end in cavity 61 and on the other end in a hollow 65 defined within hood 57. Each through-channel 63 has approximately in the axial center thereof two spaced-apart clamp recesses 67. At the end opening in hollow 65, each through-channel 63 has a section 49 of enlarged diameter. With the aid of a recess 71 formed in the vicinity of hood 57 and having longitudinal recess parts 73 extending near the outer circumference of the connector housing 27, and having a transverse recess part 75 connecting the centers of said parts 73, a forward resilient or spring sleeve 77 is formed between hollow 65 and transverse recess part 75, and a rear resilient or spring sleeve 79 is formed on the other side of said transverse recess part 75.

Approximately in the axial center thereof, the connector housing 27 is provided with spaced-apart sealing ring grooves 81.

Figure 8:
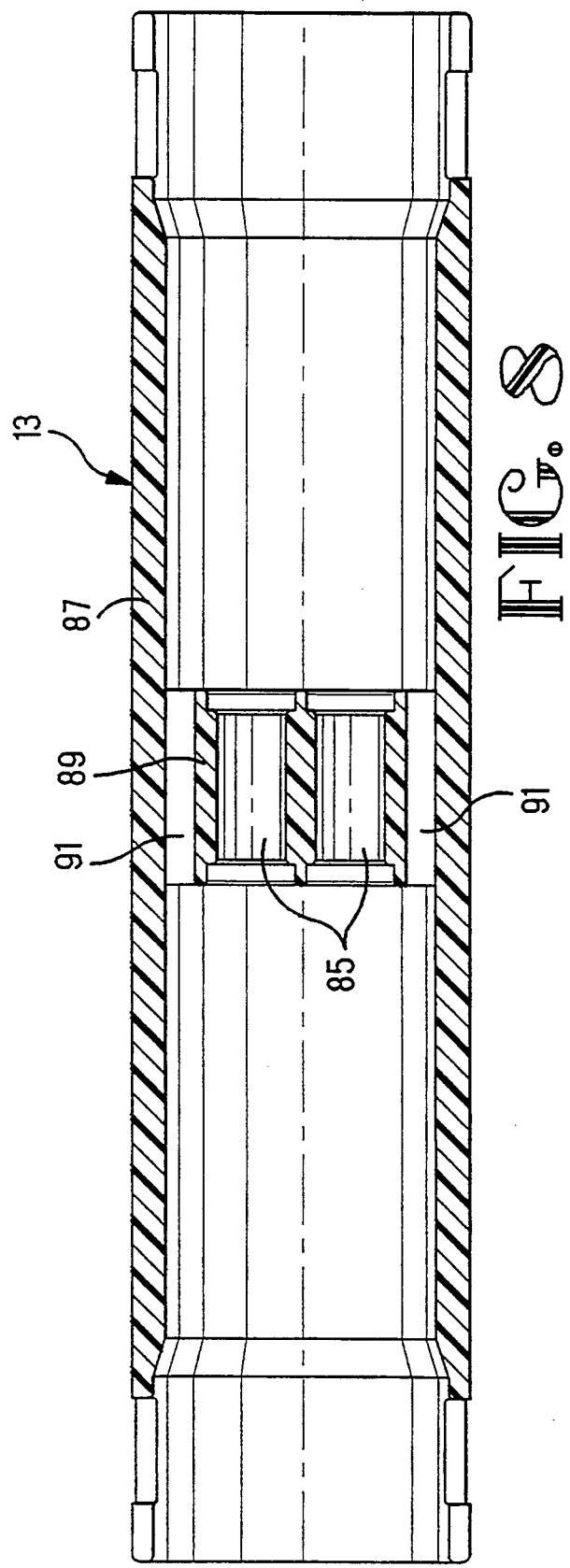

The housing sleeve 13, shown in a longitudinal sectional view in FIG. 8, for receiving the two connectors 15 and 17 to be coupled is provided in its axial center with a centering means having two centering receiving chambers 85. Spaces 91 are present between an outer peripheral wall 87 and radial outside walls 89 of the centering receiving chambers 85.

Figure 9:
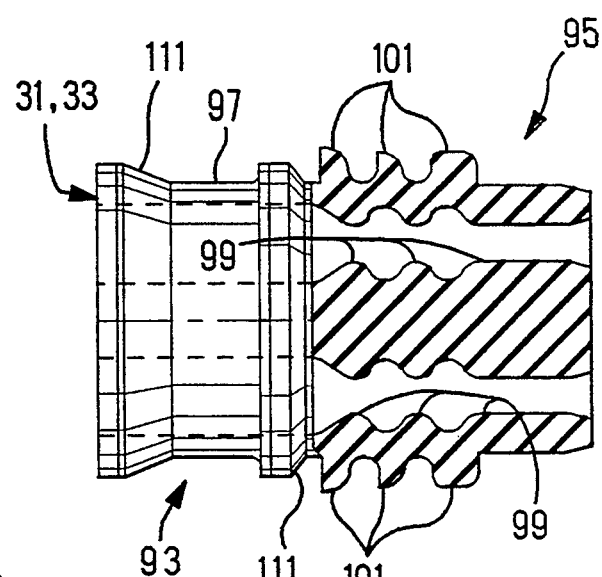

FIG. 9 illustrates one of the two sealing and strain relieving plugs 31 and 33. A sealing plug portion 93 is of cylindrical configuration and consists, for instance, caoutchouc. This is followed by a strain relieving portion 95 of plastics material, for instance silicone caoutchouc. Two through-channels 97 extend through the entire length of the sealing and strain relieving plug, and optical waveguides can be passed therethrough. Across part of the strain relieving portion 95, the through-channels 97 have wave-shaped constriction projections 99. Furthermore, the outer circumference of the strain relieving portion 95 is provided with sealing lips 101.

Figure 10:
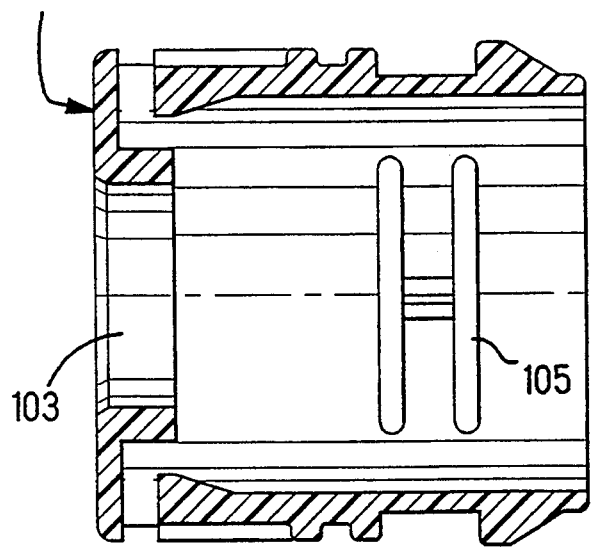

FIG. 10 shows in a longitudinal sectional view one of the two bayonet-type covers 35, 37 in the form of a cylinder open at the front end on the right side in FIG. 10 and closed at the rear end on the left side in FIG. 10 with the exception of an entrance opening 103 for the optical waveguides. The outer circumference of the cylinder portion is provided with recesses and projections for a bayonet-type locking effect with the associated end portion of the housing sleeve 13. A cover latching member 105 is provided in the cylinder wall portion.

Figure 11:
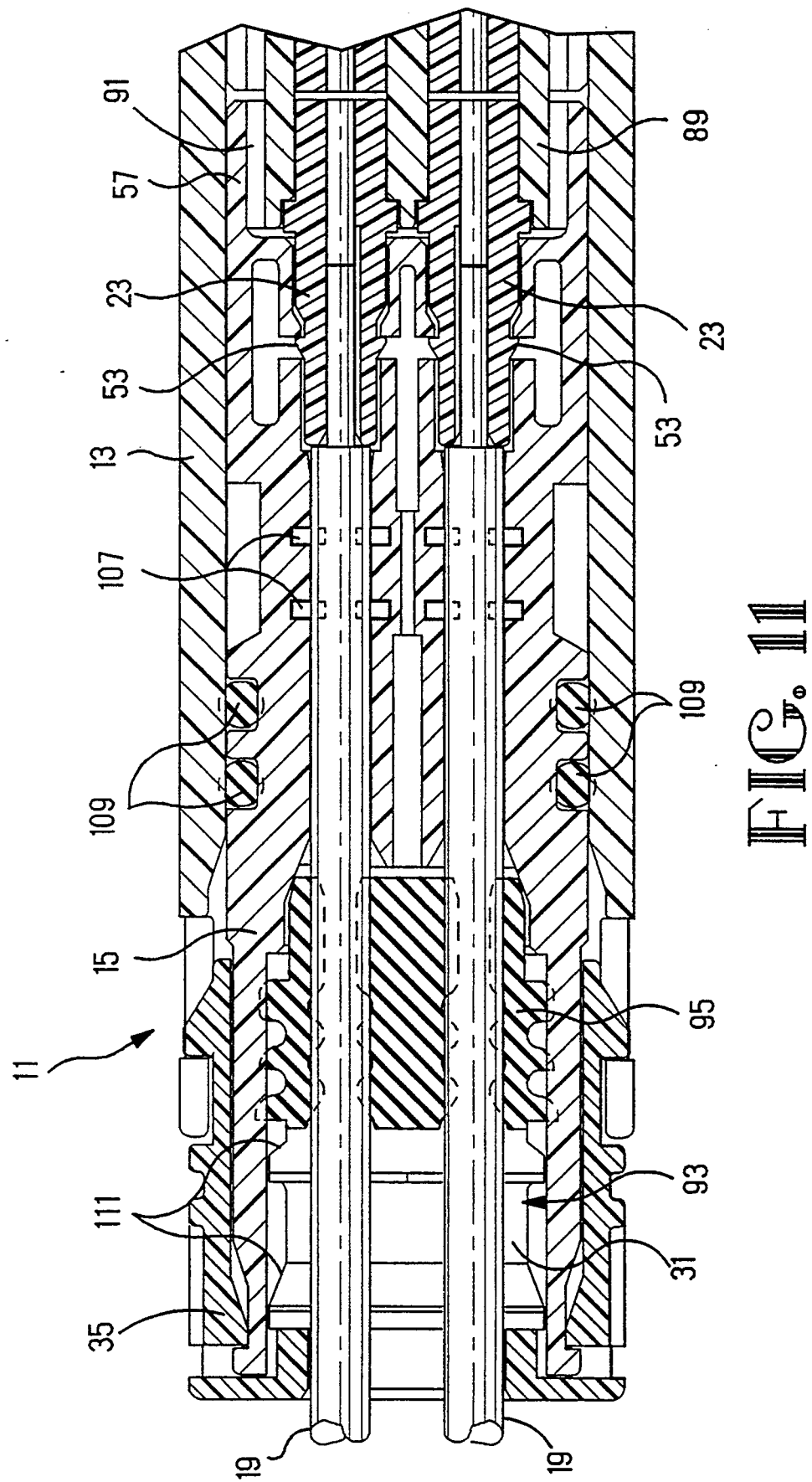
FIG. 11 shows an enlarged sectional view of the connector assembly depicted in FIG. 1.

The cooperation of the individual parts of the connecting assembly 11 will be elucidated now by way of FIG. 11, in which only connector 15 is shown completely while just a small part on the mating side end is shown from connector 17.

As shown in FIG. 11, the two connectors 15 and 17 are inserted in housing sleeve 13 in such a manner that the hoods 57 of the two connector housings 27 and 29 are located in the annular space 91 of the housing sleeve 13. The terminating members 23 have their coupling side ends and the circumferential ribs 51 located in the centering receiving chambers 85 such that the coupling faces 43 of the opposed terminating members 25, 27 are adjacent one another with a (prescribed) spacing gap of 0.2 mm being present therebetween. The portions of the terminating members 23, 25 located between the circumferential ribs 51 and the optical waveguide insertion ends 45 are floatingly supported, i.e. with certain axial play, in the sections 49 of enlarged diameter of the through-channels 63 of the respective connector housing 27 and 29, respectively.

The optical waveguides 19, 21 each have an optical waveguide core and a waveguide jacket surrounding said core. The end portions of the optical waveguides 19, 21 located in the through-openings 41 of the terminating members 23, 25 have the waveguide jacket stripped therefrom. The portions of the optical waveguides 19, 21 located outside of the terminating members 23, 25 are provided with the waveguide jacket. Each optical waveguide is retained at multiple locations in its portion between the associated terminating member and the associated entrance opening 103 of the respective bayonet-type cover 35, 37. One such retention is established by two U-shaped clamps 107 pressed into the clamp recesses 67 of the associated through channel 63 and fixing the optical waveguide in its position. Furthermore, each optical waveguide is retained in the associated through channel 97 of the associated sealing and strain relieving plug 31, 33 by means of the constriction projections 99.

FIGS. 1 and 11 shows the constriction projections 99 and the sealing lips 101 of the strain relief portion 95 in their rest positions in order to illustrate their strain relieving and sealing effect, respectively. However, in reality the constriction projections 99 abutting the optical waveguide and the sealing lips 101 abutting the connector housing 27, 29, due to the resilience of their material, have adapted themselves to the outer circumference of the optical waveguides 19, 21 and to the inner circumference of the connector housing 27, 29, respectively, and do not penetrate thereinto.

Sealing O-rings 109 are inserted in the annular sealing grooves 81 of the connector housings 27, 29 and sealingly abut the inner circumference of the housing sleeve 13.

The sealing plug portion 93 of each sealing and strain relieving plug 31, 33 is provided with two circumferential ribs 111 each sealingly abutting on the inner wall of cavity 61 of the associated connector housing 27, 29. The coupling portion between both connectors 15, 17 and between the optical waveguides 19, 21 thereof thus is made waterproof.

The bayonet-type cover 35 is releasably attached to the housing sleeve 13 by means of the aforementioned bayonet-type latching mechanism, with a circumferential bead 113 at the optical waveguide insertion end 59 of the associated connector housing 27 being fixed between the end of the housing sleeve 13 and the cover part of the bayonet-type cover 35.

Due to the fact that the two opposing terminating men, hers 23, 25 have their coupling side end portions each held in a common centering receiving chamber 85 of the housing sleeve 13 and since their remaining portions located in the enlarged diameter sections 69 of the associated through-channels 63 are floatingly supported, mutual radial centering of the two opposing terminating members 23, 25 and thus of the two optical waveguide sections 47 glued therein is ensured even if the two connectors 15, 17 participating in the connection assembly 11 are not positioned in correspondingly exact manner with respect to each other, for instance because of tolerance or temperature reasons.

The bayonet-type covers 35, 37 remain latched to the pluggable connectors 15 and 17, respectively, with the aid of their cover latching member 105 even when the pluggable connection is released. For release of the pluggable connection, the bayonet type lock between the bayonet-type cover 35 and 37, respectively, and the associated end of the housing sleeve 13 is released and the connector 15 or 17 belonging to this bayonet-type cover is withdrawn from the housing sleeve 13. Establishing of the connection takes place in correspondingly opposite manner.

Each terminating member is retained by means of its latching projection 53 in the associated transverse recess part 75 of the associated connector housing 27 or 29, respectively.

Figure 12:
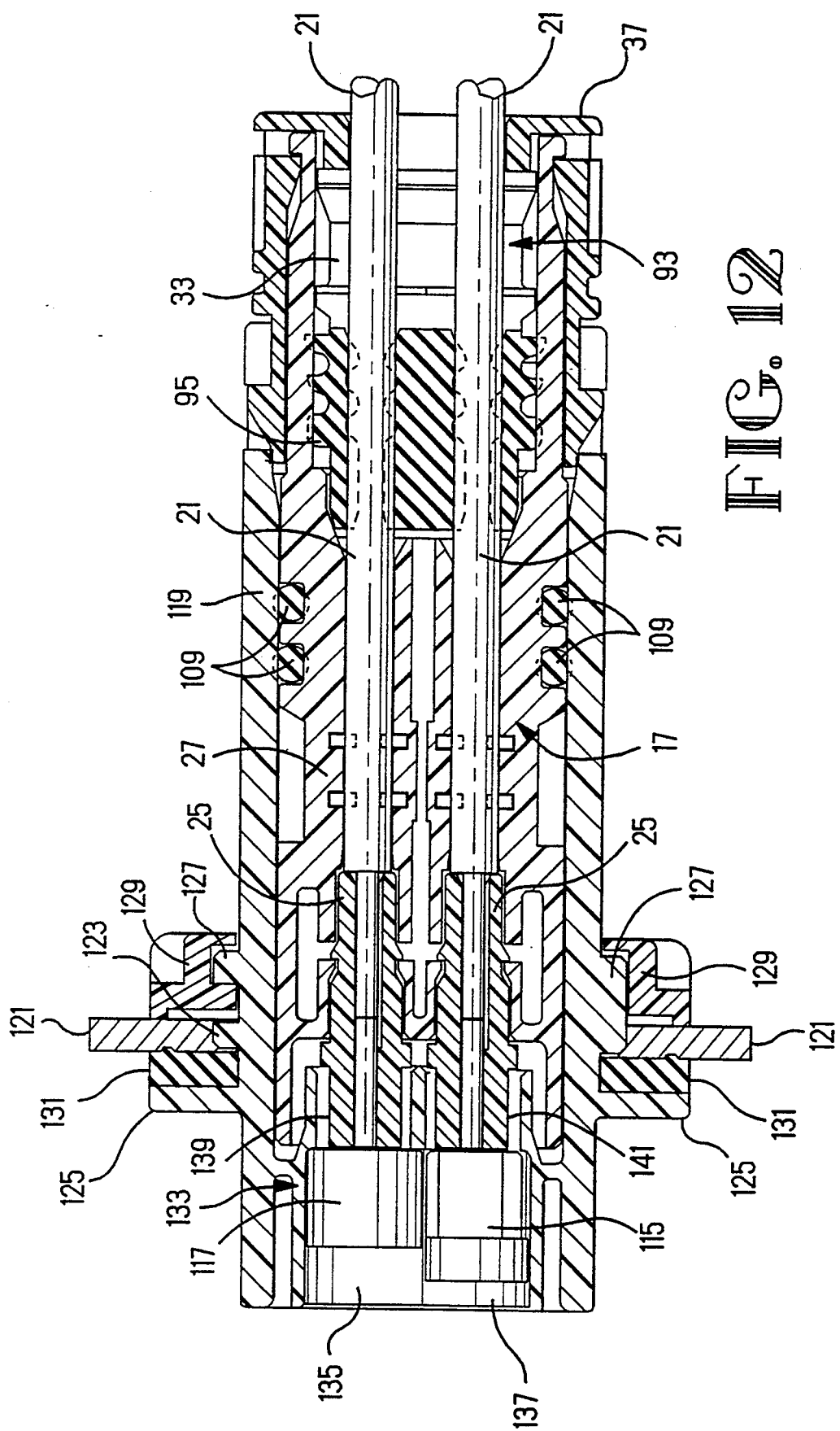
FIG. 12 shows a longitudinal sectional view of a second embodiment of a connector assembly according to the invention.
Figure 13:
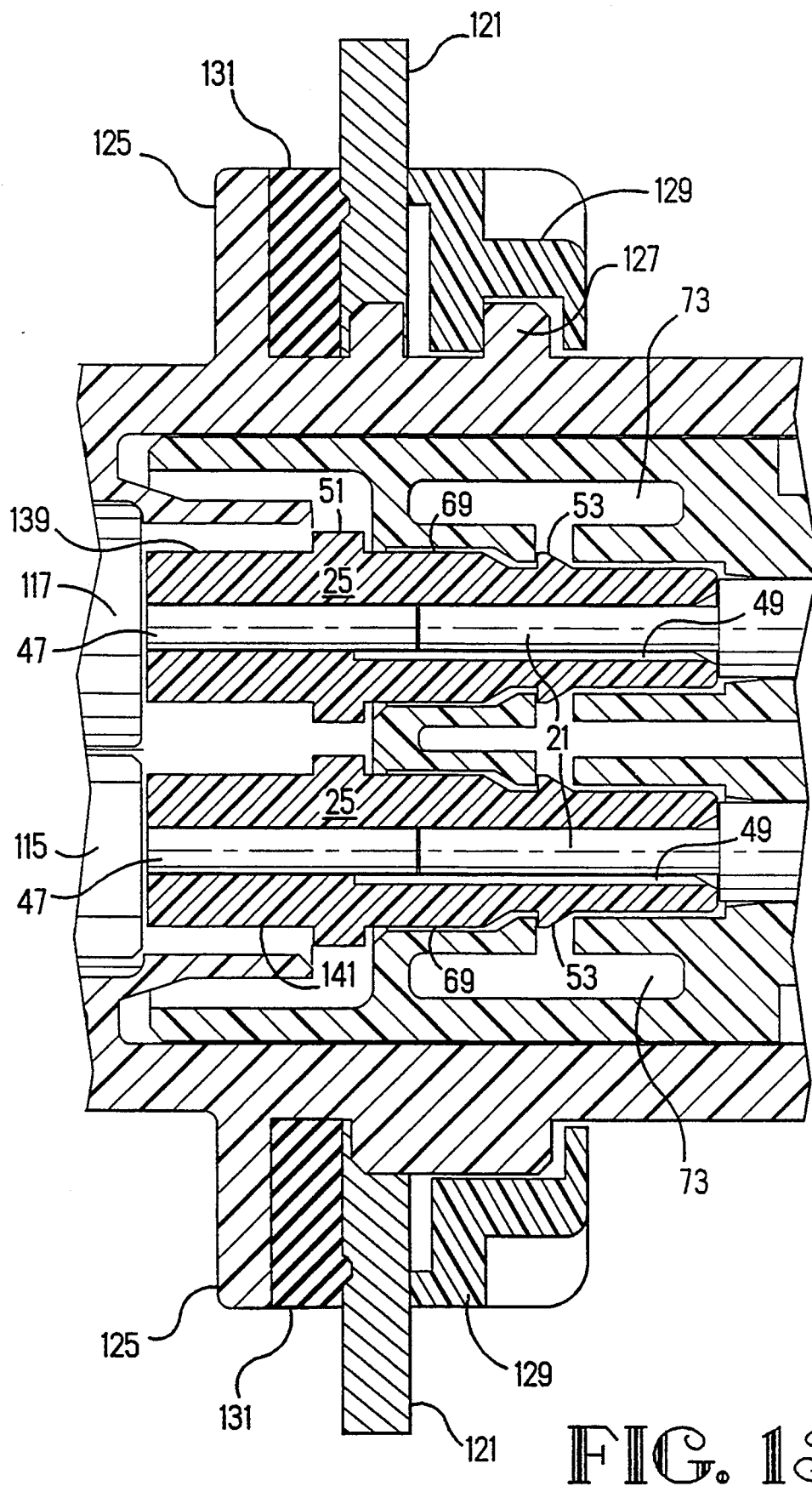
FIG. 13 shows an enlarged sectional view of the connector assembly depicted in FIG. 12.

FIG. 1 to 11 illustrate an embodiment of a freely suspended or routed connection assembly for coupling a pair of optical waveguides 19, 19 with a second pair of optical waveguides 21, 21. FIGS. 12 and 13 show an embodiment of a connection assembly that can be mounted in a mounting opening of a mounting wall, for instance of an apparatus or of a vehicle partition wall. While in the embodiment shown in FIGS. 1 to 11 a connection assembly is formed using two identical connectors, the connection assembly in the embodiment shown in FIGS. 12 and 13 is established using two different connectors, one thereof including terminating members 25 with optical waveguides 21 terminated thereto and the other one containing two optoelectronic components, namely a photodiode 115 as light-transmitting member and a phototransistor 117 as light-receiving member. The connector containing the photodiode 115 and the phototransistor 117 constitutes a housing part located on the side of the apparatus and having a housing sleeve part 119 for receiving the connector 17.

FIG. 12 shows part of a mounting wall 121 having a mounting opening 123 for the passage of the housing sleeve part 119. The housing sleeve part 119 has, on the apparatus side of the mounting wall 121, a mounting flange 125 projecting from the outer circumference of the housing sleeve part 119 and, on the other side of the mounting wall 121, a threaded portion 127. An annular nut 129 cooperates with this threaded portion 127. Between the mounting wall 121 and the mounting flange 125, there is provided an annular seal 131. By rotating the annular nut 129, the mounting flange 125 can be drawn in the direction towards the mounting wall 121.

Connector 17 cooperates with an apparatus plug part 133 holding photodiode 115 and phototransistor 117 and having a receiving chamber 135 for the phototransistor 117, a receiving chamber 137 for the photodiode 115, a receiving chamber 139 for the upper terminating member 25 with respect to FIG. 12 and a receiving chamber 141 for the lower terminating member 25 with respect to FIG. 12.

Upon mating of this connection assembly, the coupling side end portions and the circumferential ribs 51 of the two terminating members 25 are plugged into the receiving chambers 139, 141 of the apparatus plug part 133, whereby said members are centered with respect to the phototransistor 117 and the photodiode 115, respectively.

With this connection assembly, too, mutual centering of the optical surfaces to be coupled is thus also effected in one and the same connector part. While this part in the first embodiment is constituted by the centering means 83 of the housing sleeve 13, which receives all terminating members 25, 27 in common, it is constituted in the embodiment of FIG. 12 by the receiving chambers 135 to 141 contained in one common housing part. Due to the fact that the remaining portions of the terminating members 23, 25 are floatably supported in the associated connector housing 27 and 29, respectively, mutual centering of the opposing optical waveguides or of the opposing optical waveguides and optoelectronic components is effected exclusively by the common centering means 83 or by the receiving chambers 135 to 141 accommodated in the same housing, respectively. Also in case of relatively large tolerance-based centering deviations of the two connectors participating in the connector assembly, precise positioning of the optical coupling surfaces of the optical waveguides and optical components is thus ensured.

Figure 14:
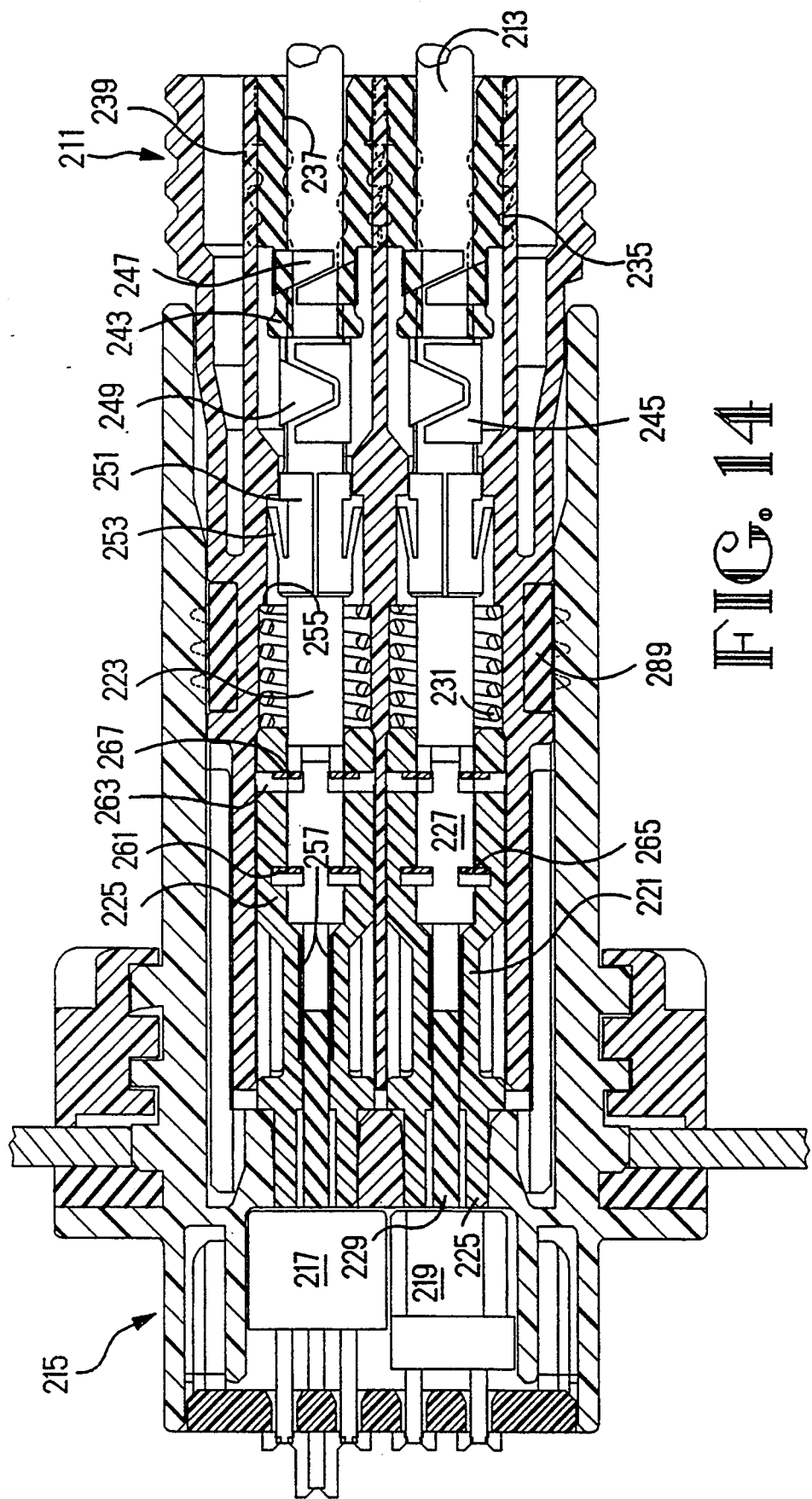
FIG. 14 shows a longitudinal sectional view of a third embodiment of an OWG connector assembly.

FIG. 14 shows a longitudinal sectional view of optical waveguide connector assembly comprising a pluggable connector 211 terminating two optical waveguides (OWG) 213, and a complementary pluggable connector 215 accommodating a phototransistor 217 and a light-emitting diode (LED) 219. Connector 211 comprises a connector housing 221 having two juxtaposed through channels 223 extending therethrough. In the mating side end of each through-channel 223 located opposite the complementary connector 215, there is located a terminating device 225 having an OWG through-opening 227. In the mating side end portion of the OWG through-opening 227 of each terminating device 225 there is mounted an OWG section 229. From the other end thereof, each OWG through-opening 227 has the end of one of the two OWGs inserted therein.

At the end of each terminating device 225 remote from the complementary connector 215, one end of a coil spring 231 abuts which at the other end is supported on a radial shoulder 233 in the respective through-channel 223.

An OWG insertion side opening of the connector 211 has inserted therein, at its end opposite the mating side, a strain relieving plug 235 having at the same time the function of a sealing plug. Extending through the strain relieving plug 235 are two OWG channels 237 through which the OWGs 213 extend. Strain relieving plug 235 has radial outer beads 239 projecting from the outer circumference thereof and radial inner beads 241 projecting into the OWG channels. The outer beads 239 and the inner beads 241 effect on the one hand sealing and on the other hand retention of the OWGs 213 in the strain relieving plug 235. At its end facing the mating side, the strain relieving plug 35 is provided with two cylinder-like sockets 243, the interiors thereof constituting a continuation of the OWG channels 237.

The OWGs 213 have an optical waveguide core surrounded by a cladding provided for improving the optical waveguiding properties of the OWG. The cladding is surrounded by a protective plastics jacket. The plastics jacket is removed only from a front part of the end of the OWG 213 disposed in the terminating device 225, whereas the OWG 213 on the remaining length thereof is enclosed by the plastics jacket.

In the region between coil spring 231 and strain relieving plug 235, each OWG 213 has a crimping barrel 245 provided thereon. Each crimping barrel 245 has a first crimping region 247 crimped about the associated socket 243 of the strain relieving plug 35 and a second crimping region 249 crimped about the adjacent portion of the OWG 213. At an end facing coil spring 231, each crimping barrel 245 is provided with a cylindrical locking portion 251 from whose diametrically opposed sides one locking lance 253 each projects obliquely towards the second crimping region 249. The locking lances 253 cooperate with a correspondingly positioned radial locking shoulder 255 in the associated through-channel 223.

OWG section 229 consists of plastics material, preferably acrylic glass. In particular when the connector assembly and the OWGs 213 are to be accommodated in an environment subject to mechanical shocks, vibrations etc., the light-conducting cores of the OWGs 213 also consist of plastics material, preferably acrylic glass.

OWG section 229 is glued into OWG through-opening 227.

The mating side end face of the OWG section 229 is either ground so as to be plane, preferably together with the mating side end face of the terminating device 225, or the surface of this end face of the OWG section 229 is provided in the form of a collective lens by means of which the light leaving OWG section 229 is focussed or the light entering OWG section 229 is collected, respectively.

OWG through-opening 227 has a mating side portion of smaller diameter and an OWG insertion side portion of larger diameter. The smaller diameter is matched to the outer diameter of the OWG 213 provided with the cladding, but freed from the plastics jacket. The larger diameter is matched to the outer diameter of the plastics jacket of the OWG 213. The OWG section 229 and the end of the OWG 213 freed from the plastics jacket abut each other in the smaller diameter portion of the OWG through-opening 227. For ensuring good optical coupling between OWG section 229 and OWG 213 even if the opposed end faces thereof do not abut each other perfectly, an adaptation gel is introduced in the OWG through-opening 227 after mounting of the OWG section 229 in the terminating device 225, but prior to introducing the end of the OWG 213 freed from the plastics jacket. The adaptation gel has an optical refractive index equal to those of OWG section 229 and OWG 213.

For enabling escape of excess adaptation gel between the two end faces of OWG section 229 and OWG 213 being moved towards each other, each OWG through-opening 227 has two gel discharge channels 257 opening into the larger diameter portion of the OWG through-opening 227.

For safe retention of the OWG 213 in the terminating device 225 after full insertion thereof in the OWG through-opening 227, there is provided a substantially U-shaped locking clevis or strap 259 whose legs are constituted by two locking forks, namely a mating side locking fork 261 and an OWG insertion side locking fork 263. The two locking forks 261 and 263 each extend perpendicularly from the web of the locking clevis 259, said web extending parallel to the longitudinal axis of OWG 213. Each locking fork 261, 263 has a clamping slot for clamping the locking fork 261 or 263 on the plastics jacket of OWG 213. The two locking forks 261 and 263 are each seated in a mating side fork receiving opening 265 and an OWG insertion-side fork receiving opening 267, respectively. The two fork receiving openings 265 and 267 are dimensioned so as to permit, to a predetermined extent, movement play of the locking forks 261, 263 and thus of the locking clevis 259 in the longitudinal direction of the OWGs.

The OWG insertion side end of the terminating device 225 is provided in the form of an actuating ram 269 that is longitudinally movable relative to the remainder of the terminating device 225. Between the mating side end of the actuating ram 269 and the opposite end of the stationary part of the terminating device 225 there is formed a gap constituting the OWG insertion side fork receiving opening 267.

During assembly, locking clevis 259 preferably is brought first into a pre-assembled position in which it is not yet completely pressed into the terminating device 225, but still projects partly into connector housing 221. When OWG 213 is then introduced into the terminating device 225 until it hits OWG section 229, locking clevis 259 is urged into a final assembly position in terminating device 225 in which the two locking forks 261, 263 engage the plastics jacket of OWG 213. In doing so, locking clevis 259 is positioned such that the locking forks 261 and 263 thereof are seated in the fork receiving openings 265 to 267 in such a manner that the locking forks 261 and 263 still have a possibility to move in the direction of the longitudinal axis of OWG 213 towards OWG section 229.

When the two opposing face sides of OWG section 229 and OWG 213 are not yet abutting each other at that time, the spring pressure exerted on locking clevis 259 by coil spring 231 via actuating ram 259 has the effect that the locking forks 261 and 263 positioned on the plastics, jacket of OWG 213, in accordance with the movement play permitted to them by the fork receiving openings 265 and 267, perform a movement towards OWG section 229 along with a concomitant movement of OWG 213. For definitely obtaining abutment of the opposing end faces of OWG section 229 and OWG 213, the two fork receiving openings 265 and 267 must have a correspondingly large width in the axial direction of the OWG 213. When the movement of the locking clevis 259 relative to the terminating device 225, which movement is effected by coil spring 231, has caused abutment of OWG section 229 and OWG 213 against each other, the pressure of coil spring 231 has the effect that the entire terminating device 225 is urged in the direction towards the mating side end of connector 211. The effect achieved by this movement is that the mating side face end of the OWG section 229 is always urged into abutment with the opposing optoelectronic component in the form of phototransistor 217 or LED 219.

In the manner according to the invention, it is achieved by means of one single coil spring 231 that both the OWG section 229 and the OWG 213 are always urged against each other, and that the mating side end face of the OWG section 229 is always urged in optimum manner against the associated optoelectronic component.

In the embodiment shown in FIG. 14, the OWGs 213 are each coupled with an optoelectronic component via the associated OWG sections 229. However, connector 211 can also cooperate with a complementary connector which also terminates OWGs. In this case the mating side end faces of the OWG sections 229 of connector 211 are optically coupled with the mating side end faces of OWG sections of the complementary connector. A basic example of this type is depicted in FIG. 1.

The crimping barrels 245 have several functions. On the one hand they hold the strain relieving plug 235, which at the same time serves as sealing plug, in the connector housing 221. On the other hand they hold the associated OWG 213 in a specific position within connector housing 21. Furthermore, they effect strain relief for OWG 213. Pulling at the end of OWG 213 extending out of the connector housing 221 is taken up by the strain relieving plug 235 on the one hand and by the locking lances 253 on the other hand. For being able to accommodate thermal expansions, the free ends of the locking lances 253 under normal conditions have a predetermined spacing from the locking shoulders 255. When thermal expansion takes place in which OWG 213 is moved towards the OWG insertion side end of the connector housing 221, the locking lances 253 and thus the OWG 213 still have movement play until the free ends of the locking lances 253 hit the locking shoulders 255, thereby compressing coil spring 231. When cooling takes place thereafter, coil spring 231 takes care that OWG 213 is moved again in the direction towards the mating side end of the connector housing 221.

The individual components of the pluggable connector 211 shown in FIG. 14 will now be elucidated in more detail by way of FIGS. 15 to 30.

Figure 15:
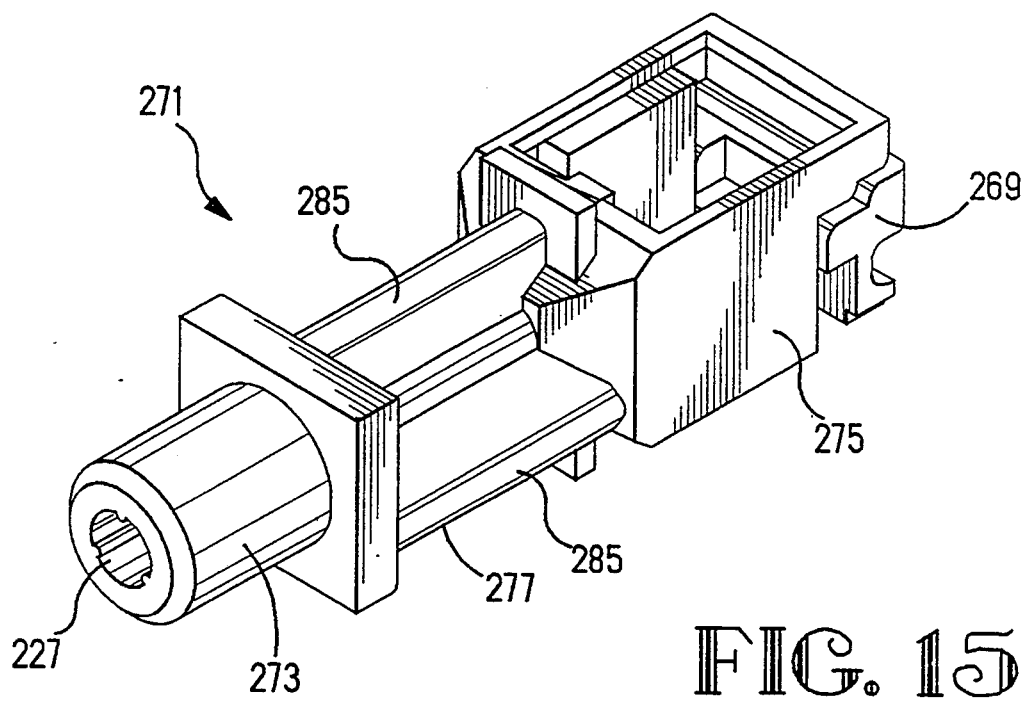
FIG. 15 shows a perspective oblique view of a terminating device suited for the OWG connector assembly according to FIG. 14.

FIG. 15 shows in a perspective oblique view a sleeve body 271 prior to supplementation thereof so as to form a terminating member, which is established by mounting an OWG section 229 and a locking clevis 259. Sleeve body 271 has substantially three portions, namely a hollow cylindrical part 273 on its mating side end shown on the left in FIG. 15, a locking clevis receiving part 275 on the OWG insertion side end shown on the right in FIG. 15, and a central part 277 therebetween. On the OWG insertion side end of the locking clevis receiving part 275 there is provided an actuating ram 269 which, via a resilient connection, is integrally connected to the locking clevis receiving part 275 and thus to the sleeve body 271 consisting of plastics material. The resilient connection between locking clevis receiving part 275 and actuating ram 269 is such that the actuating ram 269 is resiliently movable relative to the locking clevis receiving part 275 in the direction of the longitudinal axis of the sleeve body 271.

On the front face side of the hollow cylindrical part 273, one can see an OWG through-opening 227 extending through the entire sleeve body 271. Fork receiving openings 265 and 267 are located on the side of the locking clevis receiving part 275 shown at the top in FIG. 15.

Figure 16:
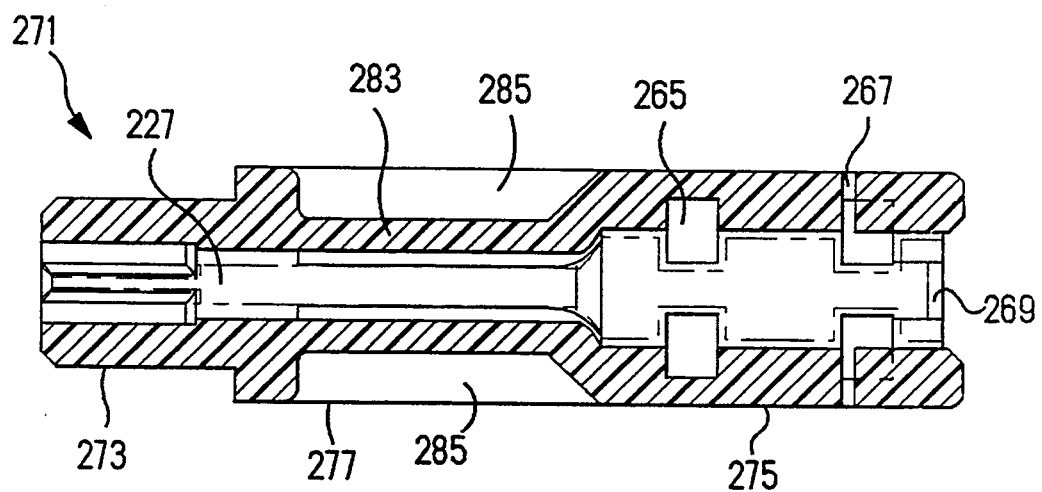
FIGS. 16 and 17 show longitudinal sectional views of the terminating device according to FIG. 15, which are offset from each other by 90°.
Figure 17:
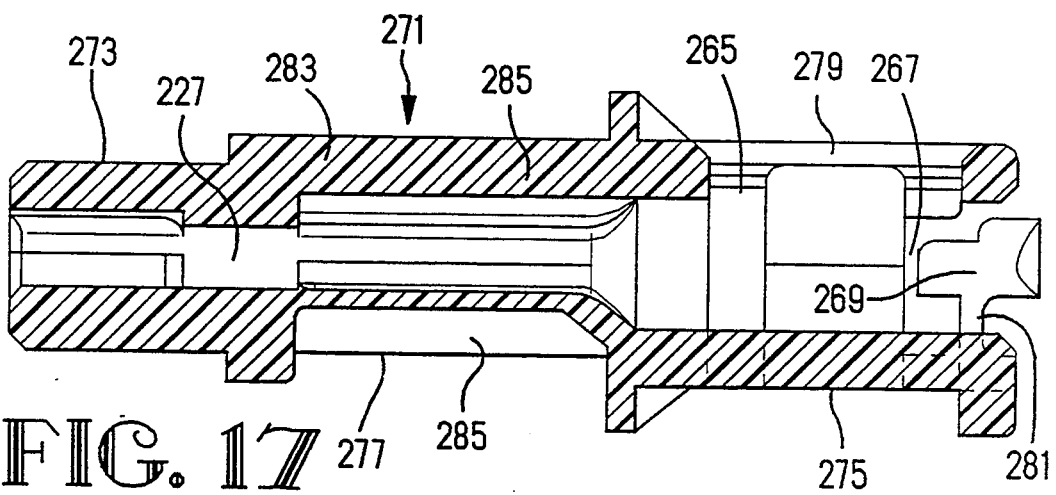
Figure 18:
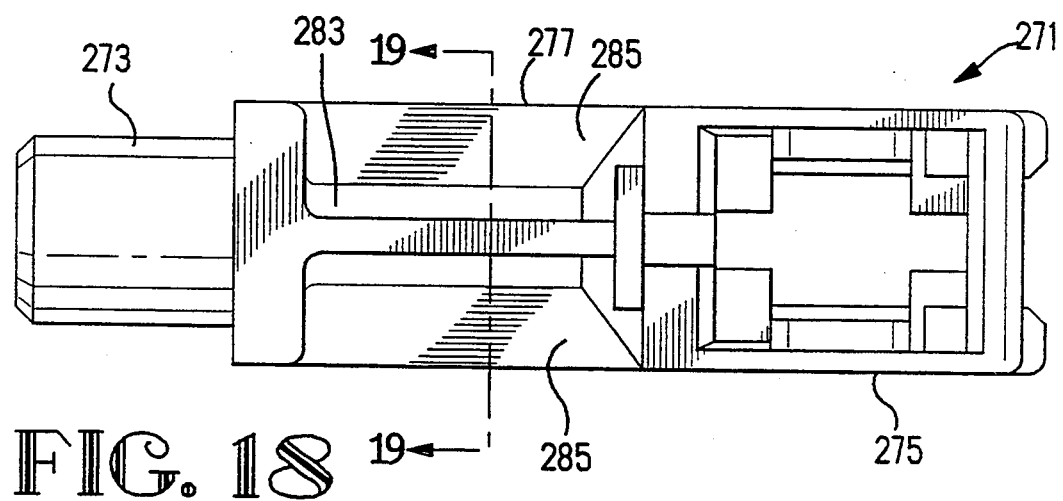
FIG. 18 shows a plan view of the terminating device according to FIG. 15.

Fork receiving openings 265 and 267 are better visible in FIGS. 16 and 17 depicting longitudinal sectional views of the sleeve body 271 along two sectional lines offset by 90° from each other. In the embodiment illustrated herein, two fork receiving openings 265 and 267, respectively, are provided for each locking fork 261 and 263, respectively. It is assumed in this respect that the branching of each locking fork 261, 263 reaches close to the locking clevis web interconnecting the two locking forks 261, 263. In particular in the event that the branching begins only at a larger distance from the locking clevis web, it is possible to provide instead of two fork receiving openings 265, 267 for each locking fork 261 and 263, respectively, one single fork receiving opening 265 and 267, respectively, bridging the OWG through-opening 227. As shown in FIG. 17, a web receiving recess 279 is located between the fork receiving openings 265 and 267, in which the locking clevis web is received when the locking clevis 259 is brought completely to its final assembly position.

As was already elucidated in conjunction with FIG. 14, the OWG through-opening 227 has a smaller diameter in the mating side portion and a larger diameter in the OWG insertion side portion, with the two diameters being matched to the diameter of the OWG 213 without plastics jacket and to the diameter of the OWG 213 with plastics jacket, respectively. As can be taken from FIGS. 16 and 17, the smaller diameter portion extends across hollow cylindrical part 273 .and central part 277, while the larger diameter portion extends through locking clevis receiving part 275 and actuating ram 269.

FIG. 17 shows in particularly distinct manner the construction of the actuating ram 269 and its connecting web 281 for resilient connection to the locking clevis receiving part 275. As shown in FIG. 15, the latter is of such a width that it can be engaged by coil spring 231. The mating side end of the actuating ram 269, when urged against the locking clevis receiving part 275, engages the OWG insertion side locking fork 263 when the locking clevis 259 is inserted in the locking clevis receiving part 275.

As shown in FIGS. 15 to 19, the central part 277 has a central sleeve tube 283 constituting approximately a continuation of the hollow cylindrical part 273 and located in the center of three supporting webs 285 arranged in the shape of a star with mutually alike angular distances from each other. The material of the sleeve body 271 and the wall thickness of the sleeve tube 283 are selected such that the sleeve tube 283 is resilient. The sleeve tube 283 thus has the effect of a centering means on the two ends of OWG section 229 and OWG 213 inserted in sleeve tube 283.

Figure 19:
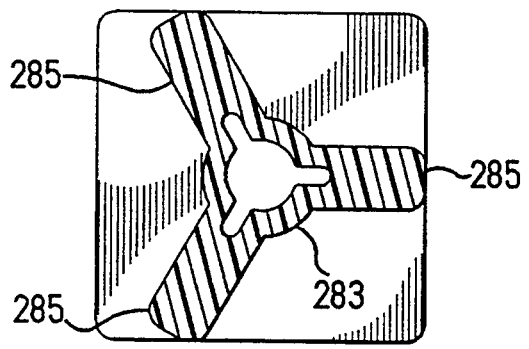
FIG. 19 shows a cross-sectional view along sectional line 19—19 in FIG. 18.

In the embodiment shown in FIG. 19, sleeve tube 283 has substantially the configuration of a hollow cylinder. The two ends of OWG section 229 and OWG 213 thus abut the inner wall of the sleeve tube 283 with a relatively large part of their outer circumference.

Figure 20:
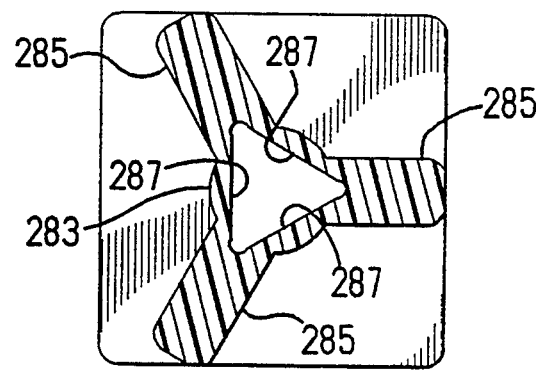
FIG. 20 shows a cross-sectional view according to FIG. 19 for a modified embodiment of the terminating device shown in FIG. 18.

A modified embodiment of sleeve tube 283 is shown in FIG. 20. The tube interior of the sleeve tube 283 is confined by three planar areas 287 constituting substantially an isosceles triangle as seen in cross-section of the tube. The dimensions of said triangle are chosen such that three-point contact is created between sleeve tube 283 and. OWG section 229 and OWG 213, respectively. This results in a particularly good centering effect of sleeve tube 283.

Figure 21:
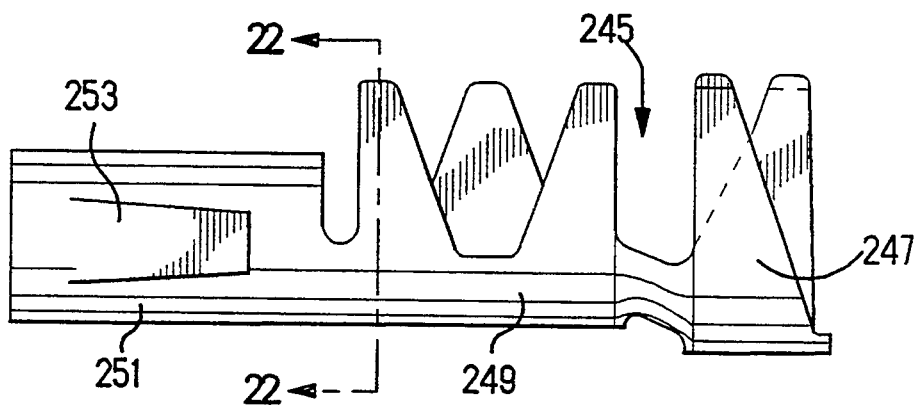
FIG. 21 shows a longitudinal side view of a crimping barrel used in the OWG connector assembly according to FIG. 14, prior to the crimping operation.
Figure 22:
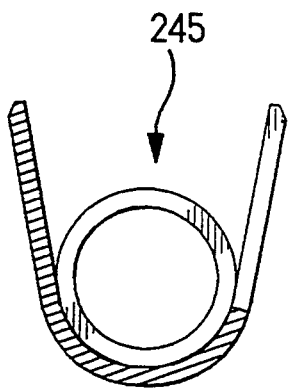
FIG. 22 shows a cross-sectional view of the crimping barrel along sectional line 21—21 in FIG. 21.
Figure 23:
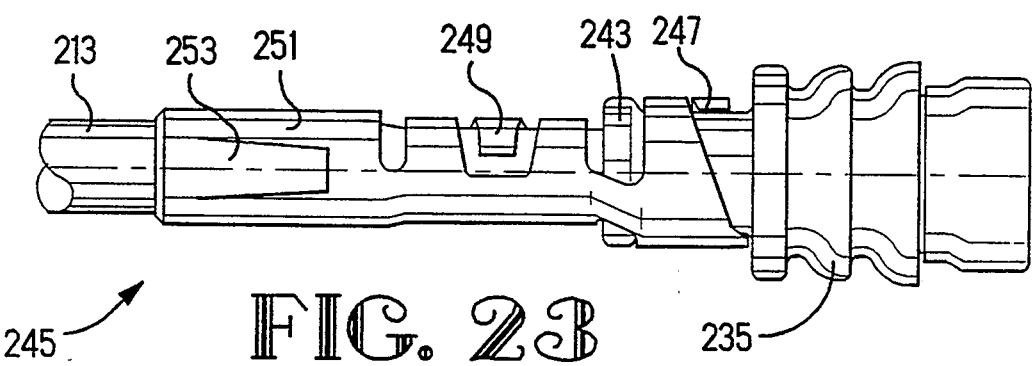
FIGS. 23 and 24 show longitudinal side views, offset by 90°, of the crimping barrel according to FIG. 21 crimped to an OWG and to a strain relief means.
Figure 24:
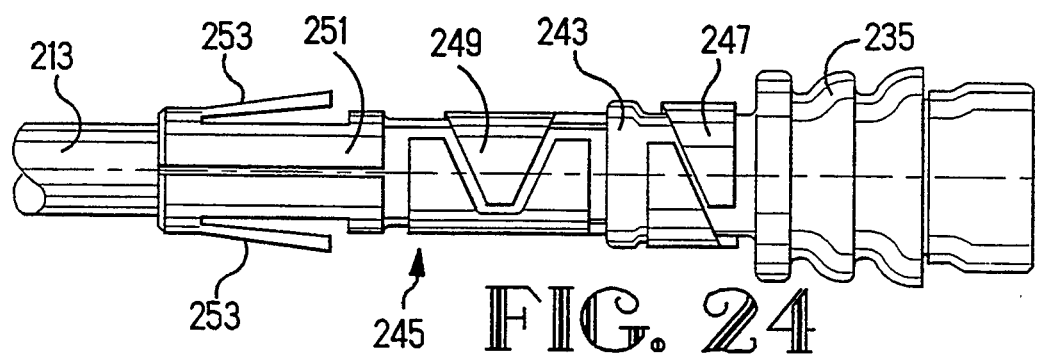

FIGS. 21 to 24 relate to the crimping barrel 245 FIG. 21 shows a longitudinal side view of the crimping barrel 245 alone. FIG. 22 shows a cross-sectional view thereof along sectional line 22–22. FIGS. 23 and illustrate the crimping barrel 245 in the condition in which it is crimped to OWG 213 and to strain relieving plug 235, with FIGS. 23 and 24 being longitudinal side views as seen from angles offset by 90°.

FIGS. 25 to 29 shows various assembly phases of connector 211.

Figure 25:
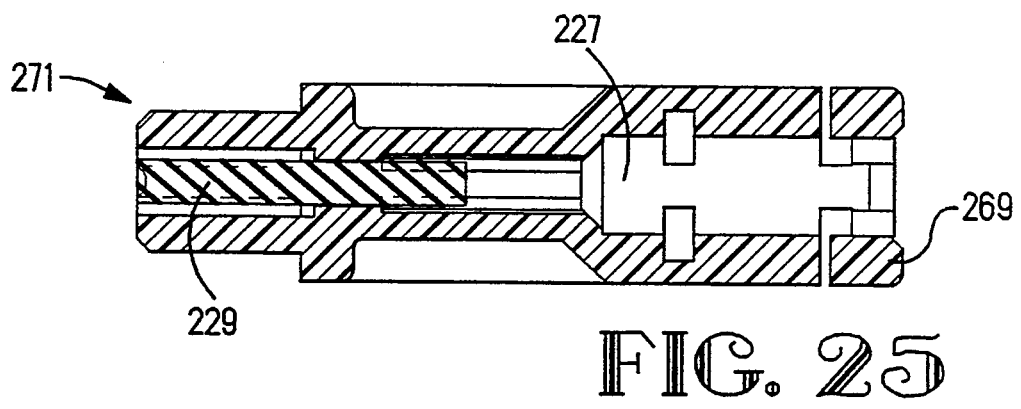
FIGS. 25 to 29 show various assembly phases of one of the two OWG connectors shown in FIG. 14.

FIG. 25 shows in a longitudinal sectional view a terminating member 225 having a sleeve body 271, with an OWG section 229 being inserted in the mating side end portion of the OWG through-opening 227. Sleeve body 271 not yet provided with a locking clevis 259.

Figure 26:
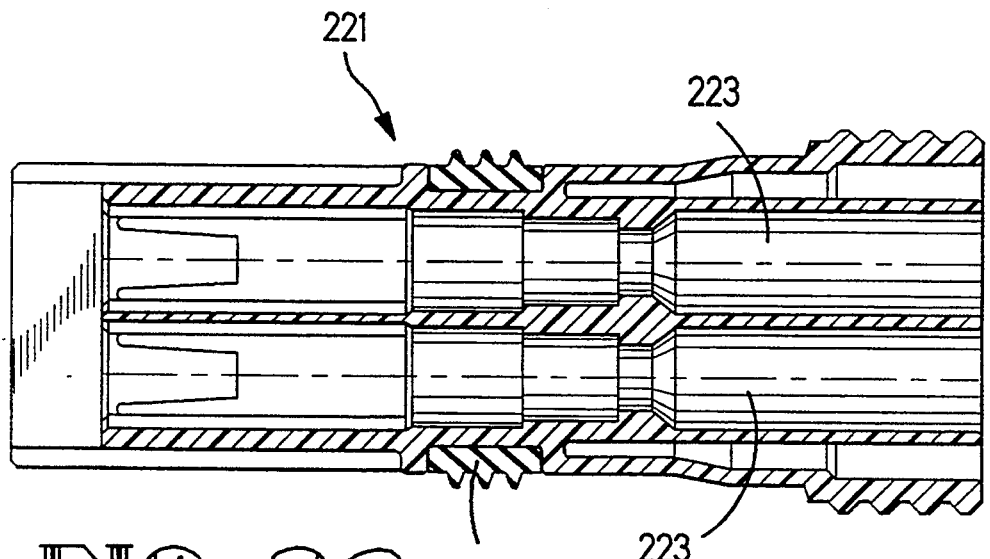

FIG. 26 shows a longitudinal sectional view through the connector housing 221 of connector 211, with said housing being provided merely with a sealing collar 289 on its outer circumference.

Figure 27:
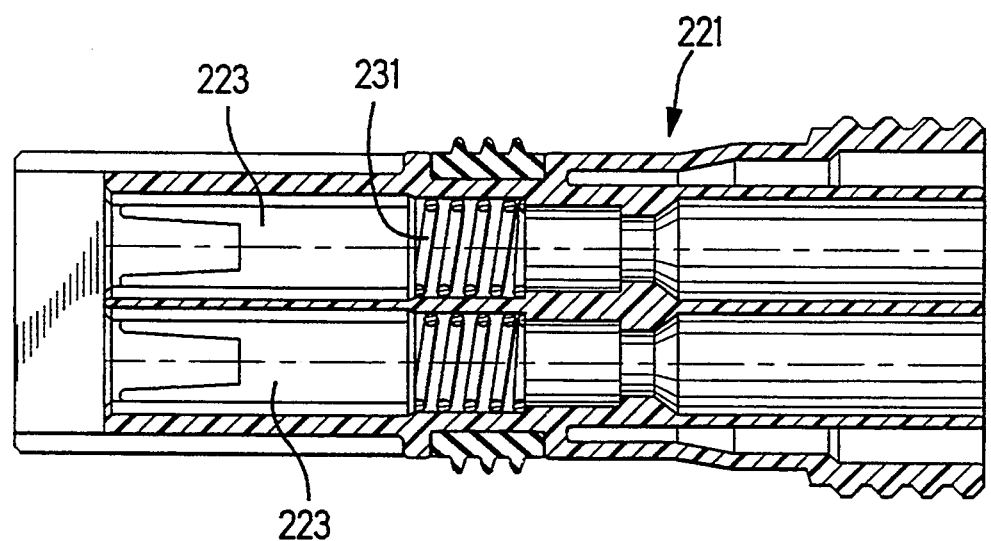
Figure 28:
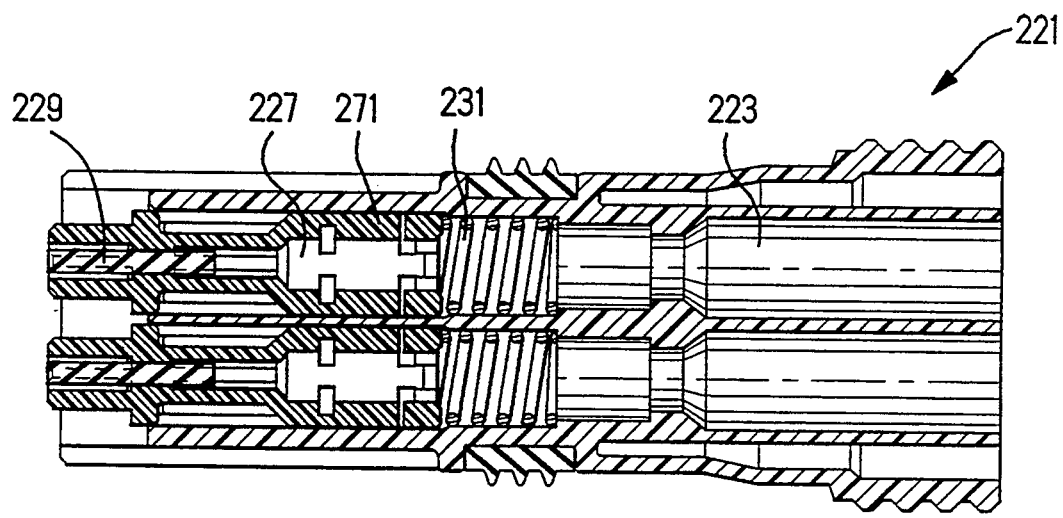

FIG. 27 shows an assembly phase in which a coil spring 231 is inserted in each of the two through-channels 223. A terminating member according to FIG. 25 is inserted next into each through-channel 223, as illustrated in FIG. 28.

Figure 29:
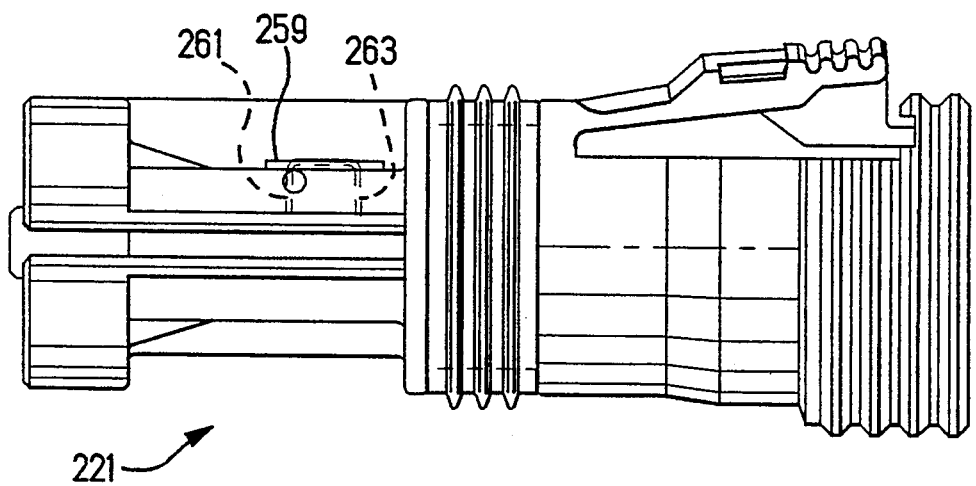

FIG. 29 finally shows the completely assembled connector 221, however without OWG 213, with the locking clevis 259 with the two locking forks 261 and 263 being inserted as shown in broken lines. The completely assembled condition, but without OWG 213, is shown once more in the longitudinal sectional view of FIG. 30 in which it is assumed that the two locking clevises 259, due to the pressure force of the coil springs 231 transmitted via the actuating rams 269, are abutted with their locking forks 261 and 263 against the mating side limits of their fork receiving openings 265 and 267, respectively. However, the locking forks 261 and 263 normally reach this position within the fork receiving openings 265 and 267 only after insertion of the OWGs 213 in the sleeve bodies 271. For, after insertion of the OWGs 213 in the OWG through-openings 227 of sleeve bodies 271, the locking clevises 259 are preferably pressed onto the respective OWG 213 in such a manner that the locking forks 261 and 263 still have movement play in the direction towards the mating side limit of the fork receiving openings 265 and 267 so that the end faces of OWG section 229 and OWG 213 can still be urged against each other with the aid of the pressure force of the coil springs 231 if this has not yet been achieved during insertion of the OWGs 213 in the connector housing 221 and the sleeve bodies 271.

Figure 30:
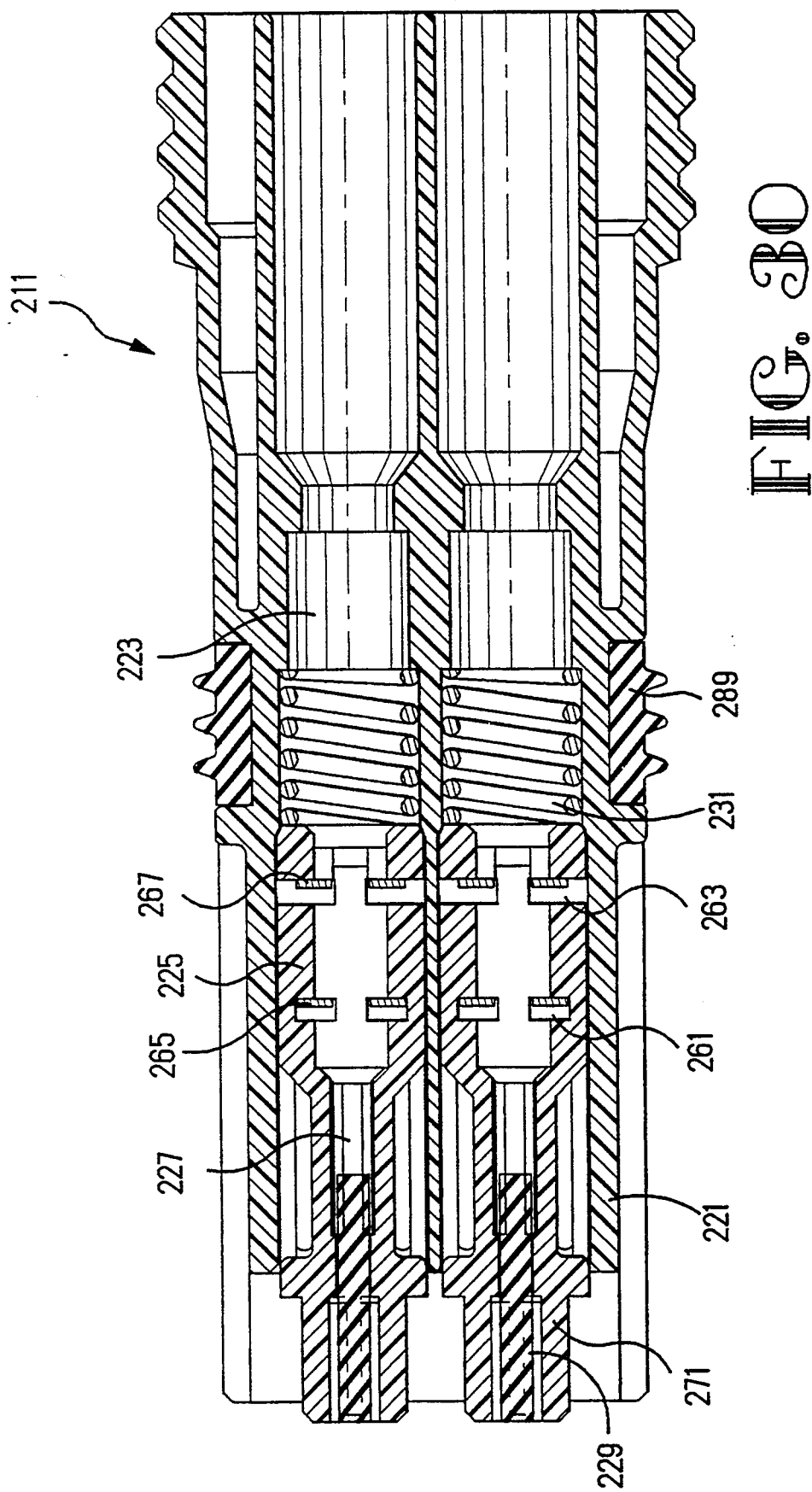
FIG. 30 shows a longitudinal sectional view of this OWG connector in the completely assembled condition thereof, but without an OWG to be terminated.

In the presentation of FIG. 30 the locking clevis 259 is in a pre-assembled position in which locking forks 261 and 263 are however already inserted partly in the fork receiving openings 265 and 267. Due to the fact that an OWG 213 has not yet been inserted which could abut against the insertion side end face of OWG section 229, the locking clevis 259 is urged by coil spring 231 so as to abut the mating side limit of the fork receiving opening 265 and 267, respectively.

Upon insertion of the OWGs 213 in the two through-channels 223, the locking clevises 259 are slightly shifted back in the direction towards coil springs 231 against the pressure of said coil springs 231 before they are brought into their final assembly position and are thus clamped onto the plastics jacket of the respective OWG 213. This provides the possibility that the locking clevises 259 and the respectively associated OWGs 213 can still be urged by the associated coil spring 231 in the direction towards the associated OWG section 239 should this be necessary.

Figure 31:
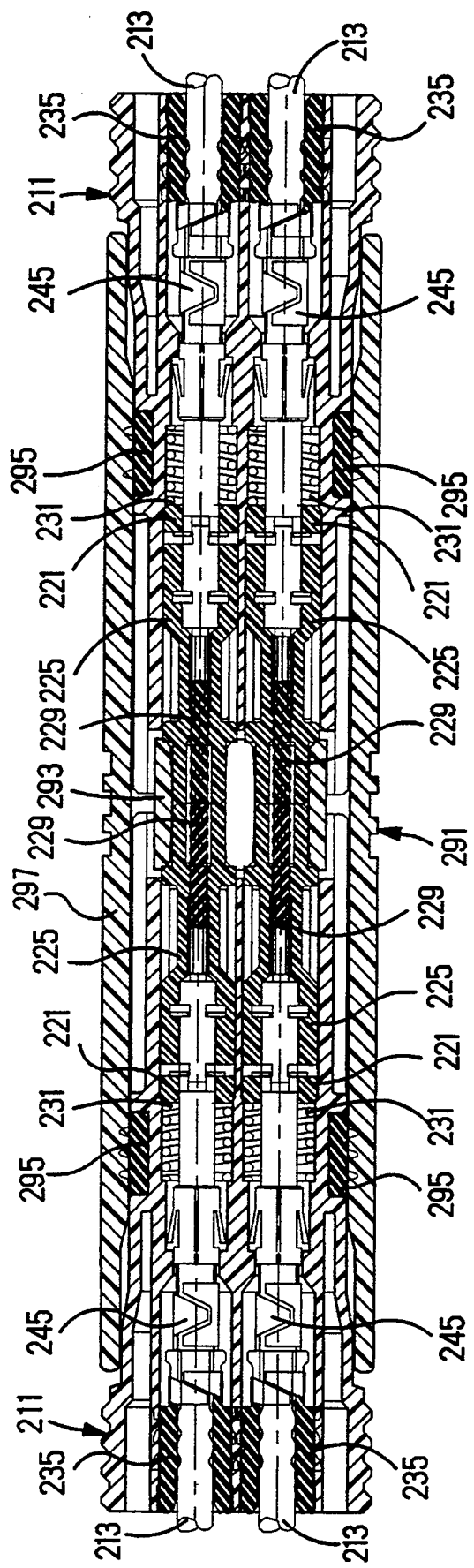
FIG. 31 shows a longitudinal sectional view of a third embodiment of an OWG connector assembly.

FIG. 31 illustrates a third embodiment of a connector assembly according to the invention in which two like connectors 211 are connected to each other, terminating a pair of optical waveguides 213, with the terminating devices 225 of the two connectors 211 having their end faces located opposite one another. The two connectors 211 are held to each other by means of a housing sleeve 291. Housing sleeve 291 is provided in its longitudinal center portion with a centering means 293 by means of which the portions of the terminating devices 225 projecting from both connectors 211 towards each other are held in pairs in centering alignment with each other. Each of the two connectors 211 is provided on its circumference with an annular seal 295 which sealingly engages an outer wall 297 of housing sleeve 291.

Figure 32:
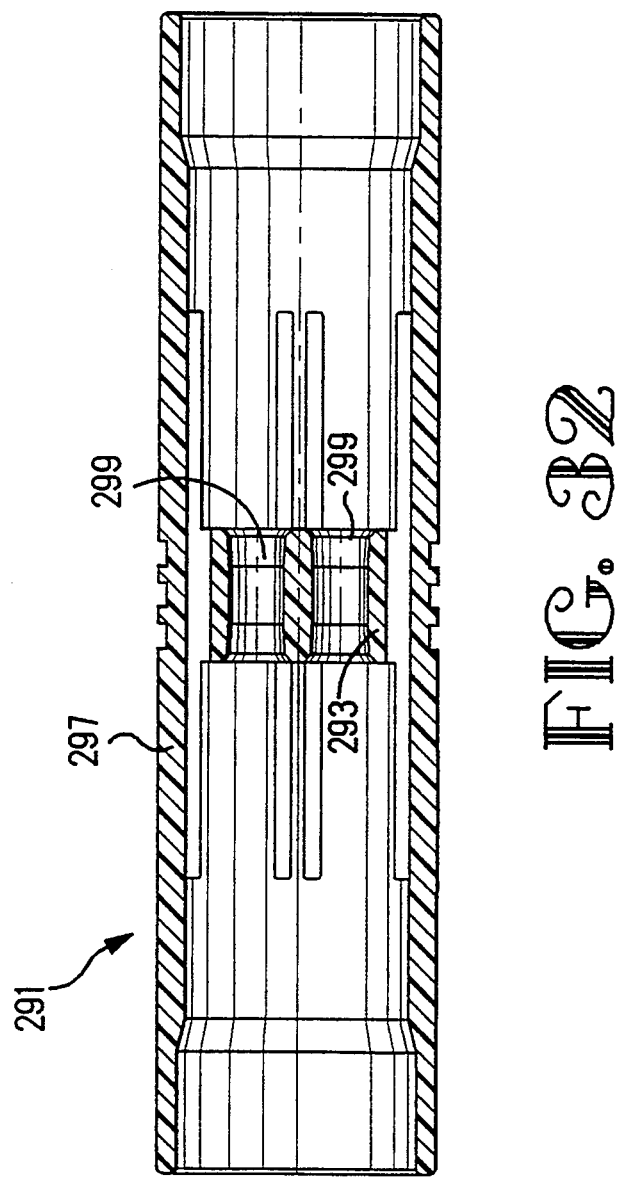
FIG. 32 shows a housing sleeve of the connector assembly illustrated in FIG. 31.

A cross-sectional view of the housing sleeve 291 alone is shown in FIG. 32. Within the tubular outer wall 297 one can see the centering means 293 having two centering receiving chambers 299. The two portions of the respectively abutting pair of terminating devices 225, which portions protrude from the respectively associated connector housing 221, project into the respective one of the two centering receiving chambers 299. The effect achieved by means of the centering receiving chambers 299 is that these protruding portions of the two abutting terminating devices 225 are held in alignment with each other with respect to their optical axis. This is desired for keeping light losses at the transition between the two optical waveguide sections 229 as low as possible.

We claim:

1. An optical waveguide connector (15, 17; 211) comprising a connector housing (27, 29; 221) for receipt of at least one optical waveguide (19, 21; 213) adapted to be coupled with another optical waveguide (21, 19; 213) or to an optoelectronic component (115, 117; 217, 219) and comprising at least one through-channel (63; 227) for an optical waveguide (19, 21,; 213), which extends in the longitudinal direction of the connector housing (15, 17; 211), characterized in that in the connector mating end portion of said through-channel (63; 227) there is disposed at least one terminating device having a sleeve-like terminating member (23, 25; 271) provided with a through opening (41; 227) having an optical waveguide section (47; 229) firmly disposed in one end thereof, said at least one terminating sleeve including an outer cylindrical surface and a tapered ramp surface, said ramp surface extending outwardly of said cylindrical surface, and an end portion of the optical waveguide (19,25; 213) to be terminated being insertable into the other end of said terminating sleeve substantially so as to reach the optical waveguide section (47; 229), the free end of the optical waveguide section (47; 229) remote from the optical waveguide (10, 21) to be terminated being provided with a plane surface.

2. An optical waveguide connector according to claim 1 characterized in that the mating end portion of the terminating member (23, 25; 271) is held in a predetermined radial position in a centering means (83; 139, 141; 299) of a connector housing part (13; 133; 291) and the remaining portion of the terminating member (23, 25, 291) is floatingly supported within the connector housing (27, 29; 221).

3. An optical waveguide connector according to claim 1 or 2, characterized in that the terminating member (23, 25) is latched In said connector housing (27, 29).

4. An optical waveguide connector according to any one of claims 1 or 2, characterized in that, said terminating member is spring loadably received in said connector housing, for spring loading said optical waveguide (229) towards said other optical waveguide or optical component.

5. An optical waveguide connector assembly according to claim 1, characterized in that the two connectors (15, 17; 211) in their mated condition are disposed in a housing sleeve (13; 291) having in its axial central portion a centering receiving means (83, 85; 299) for centered receipt of the opposed terminating members (23, 25; 271) of the two mated connectors (15, 17; 211).

6. An optical waveguide connector according to any one of claim 1, characterized in that the terminating member (271) comprises a centering part (277) comprising a thin walled sleeve tube (283) having resilient sidewalls.

7. An optical waveguide connector according to claim 6, characterized in that said terminating member (271) includes integral supporting webs extending between a forward cylindrical part (273) and a rear part (275).

8. A terminating device for optical waveguides, characterized by a sleeve-like terminating member having a sleeve body (271) provided with an optical waveguide through-opening (227) having an optical transmission member (229) firmly disposed in one end thereof and an end portion of an optical waveguide (213) to be terminated being insertable into the other end thereof substantially so as to reach the optical transmission member (229), and by a locking means (259) disposed on the sleeve body (271) which, when the optical waveguide (213) is inserted in the optical waveguide through-opening (227), engages the end portion of the optical waveguide (213) located in the sleeve body (217) and said locking means is held in the sleeve body (271) so as to be axially movable relative to the sleeve body by a predetermined amount in the longitudinal direction of the optical waveguide through-opening (227).

9. A terminating device according to claim 8, characterized in that the sleeve body (271) is provided with an actuating means (269) which is movable relative to the sleeve body (271) in the longitudinal direction of the optical waveguide through-opening (227) and which cooperates with the locking means (259) in such a manner that movement of the actuating means (269) in the direction towards the optical transmission member (229) is transmitted to the locking means (259).

10. A terminating device according to claim 8 or 9, characterized in that the locking means (259) comprises a locking fork (261, 263) which extends transversely of the longitudinal direction of the optical waveguide through-opening (227), is adapted to be placed in a clamping fit onto an optical waveguide (213) inserted in the optical waveguide through-opening (227), and is received in at least one fork receiving opening (265, 267) whose dimension in the longitudinal direction of the optical waveguide through-opening (227) is larger than the thickness of the locking fork (261, 263) in such a manner that the locking fork (261, 263) has a margin of movement in the longitudinal direction of the optical waveguide through-opening (227) corresponding to the predetermined amount of movability.

11. A terminating device according to claim 10, characterized in that the locking fork (261, 263) is adapted to be held in a pre-assembled position and in a final assembly position of the fork receiving opening (265, 267), the optical waveguide (213) in the pre-assembled position being insertable in the optical waveguide through-opening (227) without being hindered by the locking fork (261, 263), and the locking fork (261, 263) in the final assembly position being positioned on the optical waveguide (213) in a clamping fit.

12. A terminating device according to claim 10, characterized in that the actuating means comprises an actuating ram (269) held on the end of the sleeve body (271) remote from the optical transmission member (229) so as to be movable relative to the sleeve body (271) in the longitudinal direction of the optical waveguide through-opening (227), with a spacing gap being left between said end of the sleeve body (271) and the actuating ram (269) and constituting one of the fork receiving openings (265, 267), the locking fork (259) being movable in the direction towards the optical transmission member (229) by urging the actuating ram (269) to the sleeve body (271).

13. A terminating device according to claim 12, characterized in that the actuating ram (269) integrally connected to the sleeve body (271) via a resilient web member (281).

14. A terminating device according to claim 8, characterized in that, for commonly centering the optical transmission member (229) and the waveguide (213) to be terminated, the sleeve body (71), at least in that portion of its longitudinal dimension in which the optical transmission member (229) and the optical waveguide (213) to be terminated meet each other, is provided in the form of a sleeve tube (283) made of such material and having such a small wall thickness that the sleeve tube is resilient in radial direction.

15. A terminating device according to claim 14, characterized in that the tube interior of the sleeve tube (283) is confined substantially by three planar areas (287) which, as seen in a cross-section of the tube, constitute substantially an isosceles triangle with dimensions so as to create substantially only one centering three-point contact between the three planar areas (287) on the one hand and the optical transmission member (229) and, respectively, the optical waveguide (213) to be terminated on the other hand.

16. A terminating device according to claim 14, characterized in that the sleeve tube (283) is disposed in the center of three supporting webs (285) arranged in the form of a star with respect to each other.

17. A terminating device in particular according to claim 8, characterized in that the free end of the optical transmission member (229), which is remote from the optical waveguide (213) to be terminated, has an end face formed with the surface of a collective lens.

18. An optical waveguide connector comprising a connector housing (221) for receipt of at least one optical waveguide (213) adapted to be coupled with an optical waveguide or an optoelectronic component (217, 219) in a complementary connector (215), and comprising at least one through-channel (223) for an optical wave-guide (213), which extends in the longitudinal direction of the connector housing (221), characterized in that at least one terminating device (225) according to any one of claims 1, 2, 5–9 or 14–17 is disposed in the end portion of the through-channel (223) on the mating side, and in that a spring (231) is provided in the through-channel (223) which is supported in said through-channel (223) and cooperates with the locking means (259) of the terminating device (225) and which biases the locking means (259) in the direction towards the mating side end portion of the through-channel (223).

19. An optical waveguide connector according to claim 18, characterized in that said terminating device (225) is disposed in the through-channel (223) and in that the through-channel (223) has a coil spring (231) disposed therein which on one end engages a radial shoulder (233) of the through-channel (223) and on the other end engages the actuating ram (269).

20. An optical waveguide connector comprising a connector housing (221) for receipt of at least one optical waveguide (213) adapted to be coupled with an optical waveguide (213) or an optoelectronic component (217, 219) in a complementary connector (215), and comprising at least one through-channel (223) for an optical waveguide (213), which extends in the longitudinal direction of the connector housing (221), characterized in that, in the end portion of the connector housing (221) located on the optical waveguide insertion side, there is disposed a strain relief means (235) comprising at least one optical waveguide channel (237) having an optical waveguide (213) located therein, and in that, in a transition region in which the optical waveguide (213) extends out of one axial end of the optical waveguide channel (237), there is disposed a crimping barrel (245) which in a first crimping region (247) is crimped to the strain relief means (235) and in a second crimping region (249) to the optical waveguide (213) jacket.

21. A terminating device for receiving an optical waveguide adapted to be coupled to another optical waveguide, the terminating device comprising a sleeve-like terminating member having a sleeve body (271) provided with an optical waveguide through-opening (227), a portion of an optical waveguide (213) to be terminated being insertable into one end of the through-opening (227), whereas the other end of the through-opening (227) is proximate a coupling end of the terminating device, the sleeve body (271) comprising a sleeve tube (283) having wall thicknesses such that it is resilient in it's radial direction for centering the optical waveguide (213).

22. A terminating device according to claim 21, characterized in that the tube interior of the sleeve tube (283) is confined substantially by three planar areas (287) which, as seen in a cross-section of the tube, constitutes substantially an isosceles triangle with dimensions so as to create substantially only one centering three-point contact between the three planar areas (287) on the one hand the optical waveguide (213) to be terminated on the other hand.

23. A terminating device according to claim 21, characterized in that the sleeve tube (283) is disposed in the center of three supporting webs (285) arranged in the form of a star with respect to each other.

* * * * *

UNITED STATES PATENT AND TRADEMARK OFFICE
CERTIFICATE OF CORRECTION

PATENT NO. : 5,337,385
DATED : August 9, 1994
INVENTOR(S) : Kurt Baderschneider et al.

It is certified that error appears in the above-indentified patent and that said Letters Patent is hereby corrected as shown below:

Column 19:
Claim 13, line 2, insert --is-- between "(269)" and "integrally".
Column 20:
Claim 22, line 8, insert --and-- between "hand" and "the".

Signed and Sealed this

Eleventh Day of October, 1994

Attest:

BRUCE LEHMAN

*Attesting Officer*  *Commissioner of Patents and Trademarks*